US008072858B2

(12) United States Patent
Fujiune et al.

(10) Patent No.: US 8,072,858 B2
(45) Date of Patent: Dec. 6, 2011

(54) OPTICAL DISK APPARATUS, CONTROL METHOD OF OPTICAL DISK APPARATUS, AND INTEGRATED CIRCUIT

(75) Inventors: Kenji Fujiune, Osaka (JP); Jun Kikuchi, Osaka (JP)

(73) Assignee: Panasonic Corporation, Osaka (JP)

( * ) Notice: Subject to any disclaimer, the term of this patent is extended or adjusted under 35 U.S.C. 154(b) by 583 days.

(21) Appl. No.: 12/162,196

(22) PCT Filed: Jan. 25, 2007

(86) PCT No.: PCT/JP2007/051204
§ 371 (c)(1),
(2), (4) Date: Jul. 25, 2008

(87) PCT Pub. No.: WO2007/086482
PCT Pub. Date: Aug. 2, 2007

(65) Prior Publication Data
US 2009/0010126 A1    Jan. 8, 2009

(30) Foreign Application Priority Data
Jan. 27, 2006    (JP) .................................. 2006-019503

(51) Int. Cl.
*G11B 7/00* (2006.01)
(52) U.S. Cl. ................. 369/53.14; 369/53.19; 369/53.2; 369/44.32; 369/47.28
(58) Field of Classification Search .................. None
See application file for complete search history.

(56) References Cited

U.S. PATENT DOCUMENTS

| 6,300,264 | B1 | 10/2001 | Ohara | |
| 6,370,094 | B1 * | 4/2002 | Kishinami et al. | 369/44.32 |
| 6,498,772 | B1 | 12/2002 | Fujiune et al. | |
| 7,257,052 | B2 * | 8/2007 | Watanabe et al. | 369/44.26 |
| 7,782,724 | B2 * | 8/2010 | Kawabe | 369/44.34 |

FOREIGN PATENT DOCUMENTS

| JP | 2-272030 A | 11/1990 |
| JP | 2-292738 A | 12/1990 |
| JP | 03-272030 | 12/1991 |
| JP | 5-135390 A | 6/1993 |
| JP | 8-180426 A | 7/1996 |
| JP | 9-274726 A | 10/1997 |
| JP | 2000-86283 A | 3/2000 |
| JP | 2001-160226 A | 6/2001 |
| JP | 2005-182968 A | 7/2005 |

OTHER PUBLICATIONS

International Search Report for PCT/JP2007/051204, dated May 15, 2007.

* cited by examiner

*Primary Examiner* — Muhammad N Edun
(74) *Attorney, Agent, or Firm* — RatnerPrestia

(57) ABSTRACT

A disk motor which rotationally drives an optical disk; a rotational phase detector which detects a rotational phase thereof; an optical head having a collecting lens which collects an optical bean; a light detector and an LE signal generator which detect a position of the collecting lens in the optical head as a position signal; an LE signal memory recorder and an LE signal memory which store, in synchronization with a rotational phase to be detected by the rotational phase detector, the positional signal from the LE signal generator; an LE signal memory regenerator which outputs as a correction signal, in synchronization with a rotational phase to be detected, the positional signal which has already been detected; a subtractor; an LE signal filter, a drive circuit and a Tk actuator which move the collecting lens using a signal from the subtractor; and a low pass filter which reduces a high-frequency component of the correction signal are provided.

26 Claims, 17 Drawing Sheets

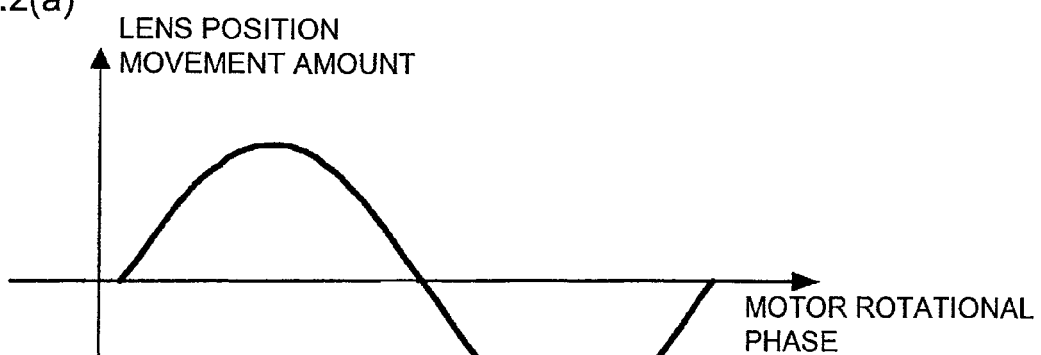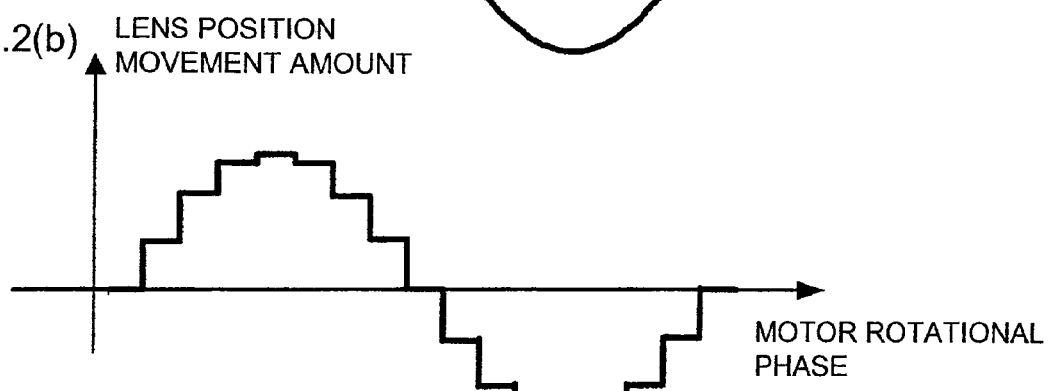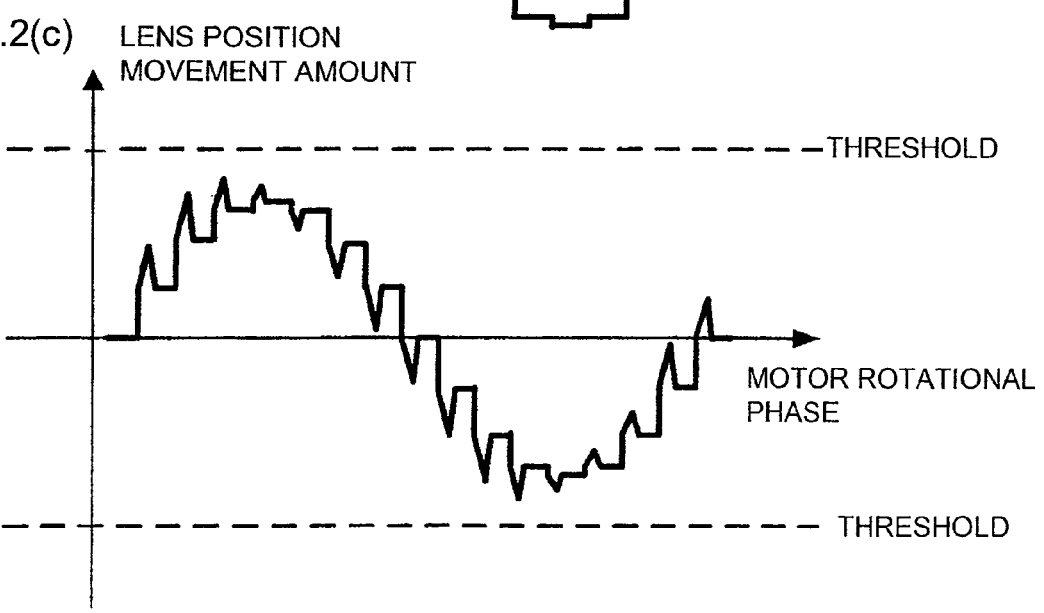

US 8,072,858 B2

OPTICAL DISK APPARATUS, CONTROL METHOD OF OPTICAL DISK APPARATUS, AND INTEGRATED CIRCUIT

This application is a U.S. National Phase application of PCT International Patent Application No. PCT/JP2007/051204 filed Jan. 25, 2007, claiming the benefit of priority of Japanese Patent Application No. 2006-019503 filed Jan. 27, 2006, all of which are incorporated by reference herein in their entirety.

TECHNICAL FIELD

The present invention is related to an optical disk apparatus and the like which causes an optical beam to follow an eccentricity of a track when recording or reproducing information on a recordable disk-shaped information carrier (hereinafter referred to as an "optical disk").

BACKGROUND ART

With a conventional optical disk apparatus, the reproduction of a signal is performed by irradiating an optical beam having a constant and relatively low light intensity on an optical disk that is an information carrier, and detecting reflected light modulated by an information recording surface of the optical disk as high/low light intensities. In addition, when recording a signal, information is written on a recording material film on the optical disk by modulating an optical beam as high/low light intensities according to the signal to be recorded.

Recording information on an optical disk or reproducing information recorded on an optical disk requires focusing control in which an optical beam is controlled in a normal direction (hereinafter referred to as a "focusing direction") of a face of an optical disk 1 so that the optical beam is constantly in a predetermined focused state on the recording material film as well as tracking control in which the optical beam is controlled in a radial direction (hereinafter referred to as a "tracking direction") of the optical disk so that the optical beam is constantly positioned on a predetermined track. Among the aforementioned, tracking control involves detecting high/low levels of reflected light from an information recording surface including tracks of an optical disk as a tracking error signal, and based thereon, moving an objective lens for collecting the optical beam on the optical disk in a tracking direction.

Incidentally, a track of an optical disk is formed in a spiral-shape on an information recording surface. In the case of a read-only disk, a row of pits is formed in a spiral shape. Additionally, in the case in which the optical disk 1 is a recordable or a readable disk, a guiding groove is formed in a spiral shape, and an optically recordable or readable material film is further formed using a method such as deposition on a substrate surface on which irregularities are formed by the guiding groove.

Normally, in the manufacturing of optical disks, a process for fabricating pits or a guiding groove including track information on a reflection surface of light from an optical head 10 by press working or the like is independent from a subsequently-performed process for fabricating a central hole for clamping.

Therefore, the center of the spiral of a track is not completely consistent with the center of the central hole of the optical disk, thereby causing eccentricity during clamping of the optical disk.

Such an eccentricity acts as a primary periodic disturbance component of the optical disk apparatus and significantly reduces following performance with respect to tracks.

Particularly, in recent years, optical disks 1 capable of high density recording in order to record large volumes of information including visual information as well as optical disk apparatuses capable of recording or reproducing information from such optical disks at high speed have come into use. In other words, there is a prominent trend towards higher speed factors. Since the greater the reproduction speed of an optical disk the greater the influence of an eccentricity, such an eccentricity must be effectively compensated in order to accurately follow a track at a high speed factor.

In consideration thereof, control of a movement of an objective lens in a tracking-direction for the purpose of compensating disk eccentricity is being performed independently of normal tracking control (for example, refer to Japanese Patent Laid-Open No. 2005-182968).

FIG. 16(a) is a block configuration diagram of an optical disk apparatus which performs such control.

A configuration and operations of a conventional optical disk apparatus will now be described with reference to FIG. 16(a). As shown in FIG. 16, an optical head 10 is mounted with a semiconductor laser 11, a collecting lens 13, a beam splitter 12, an Fc actuator 14, a Tk actuator 15 and a light detector 16. An optical beam generated from the semiconductor laser 11 passes through the beam splitter 12 and is focused above a disk-shaped optical disk 1 by the collecting lens 13.

The optical beam reflected off the optical disk 1 once again passes through the collecting lens 13 and is reflected off the beam splitter 12 and irradiated to the light detector 16. The collecting lens 13 is supported by an elastic body (not shown) and moves in a focusing direction due to an electromagnetic force when an electric current is passed through the Fc actuator 14. The collecting lens 13 moves in a tracking direction due to an electromagnetic force when an electric current is passed through the Tk actuator 15. The light detector 16 generates a signal according to a detected light intensity.

The light detector 16 sends the signal to an LE signal generator 30. Using the light intensity signal of the light detector 16, the LE signal generator 30 computes a position signal (lens shift error signal: hereinafter referred to as an "LE signal") with respect to the optical head 10 of the collecting lens 13, and sends the same to an LE signal filter 37 via a subtractor 35.

As an LE signal detection method, an LE signal can be generated by performing a sample/hold or the like on a push-pull tracking error detection signal acquired from a reflected light from the optical disk 1.

In this case, the LE signal generator 30 uses a top hold push-pull method in which are acquired respective pick/hold signals of signals from which push-pull method tracking error signals are obtained by mutual subtraction processing, whereby the pick/hold signals are subtracted from each other. Due to such a configuration, the influence of reflected light from the tracks is eliminated. (For example, refer to Japanese Patent Laid-Open No. H09-274726).

In response to a signal from the LE signal generator 30, the LE signal filter 37 generates a signal for performing lens control and sends the same to a drive circuit 73, whereby the drive circuit 73 drives the Tk actuator 15. A disk motor 20 rotates the optical disk 1, generates a predetermined pulse signal (hereinafter referred to as an "FG signal") during one rotation and sends the same to a rotational phase detector 21.

The rotational phase detector 21 generates a rotational phase of the optical disk 1 by counting FG signals from the disk motor 20 and sends the same to an LE signal memory regenerator 32 and an LE signal memory recorder 31.

Every time rotational phase information from the rotational phase detector 21 changes during an eccentricity correction recording operation, the LE signal memory recorder 31 records an LE signal of the LE signal generator 30 for each rotational phase on the LE signal memory 33.

The LE signal memory 33 retains an LE signal level for each rotational phase. Every time rotational phase information from the rotational phase detector 21 changes during an eccentricity correction recording operation, the LE signal memory regenerator 32 selects an LE signal level corresponding to the rotational phase from the LE signal memory 33 in synchronization to the change and sends the selected LE signal level to the subtractor 35. The subtractor 35 subtracts the signal from the LE signal memory regenerator 32 from the signal from the LE signal generator 30 and sends the subtracted signal to the LE signal filter 37.

Upon receiving the signal of the subtractor 35, the LE signal filter 37 generates a drive signal whose target value is the stored information of the LE signal memory 33. The drive circuit 73 receives the drive signal and passes a current through the Tk actuator 15, and moves the Tk actuator 15 in a tracking direction. Consequently, the optical beam is adapted to follow the eccentricity of the optical disk 1.

As shown, with the optical disk apparatus shown in FIG. 16(a), since lens control is performed with feedback using a lens shift amount from the LE signal generator 30, eccentricity correction can be performed in a stable manner.

Incidentally, the aforementioned lens control with feedback using a lens shift amount mainly becomes necessary when the optical head 10 performs a long-distance seek that strides a plurality of tracks at one time, and is performed when drive signals inputted to the drive circuit 73 are switched by an operation of a change-over switch 72. Normal tracking control is performed as follows. That is, the light detector 16 detects reflected light from a pit row or the like formed on an information recording surface of the optical disk 1. A TE signal generator 70 generates a tracking error signal (hereinafter "TE signal") based on the signal detected by the light detector 16. Upon receiving the TE signal, a TE signal filter 71 generates a drive signal based thereon and sends it to the drive circuit 73. The drive circuit 73 passes a current in accordance with the drive signal and moves the Tk actuator 15.

However, the present inventors have discovered the following problems in an optical disk apparatus according to the conventional art described above. With the optical disk apparatus shown in FIG. 16(a), the rotation of the optical disk 1 is a continuous quantity. In contrast, since limits exist on the capacity of the LE signal memory 33 or on the overall processing speed of eccentricity correction, rotational phase information from the rotational phase detector 21 is given as a discrete value sampled according to a count value (sampling frequency) of an FG signal.

A description will now be given with reference to FIGS. 17(a) to (c). It should be noted that, in each drawing, the graph ordinate represents positional changes of the collecting lens 13 while the abscissa represents rotational phases of the disk motor 20.

As shown in FIG. 16(a), while an LE signal representing a positional change of the collecting lens 13 based on an eccentricity of the optical disk 1 assumes a continuous sinusoidal form as shown in FIG. 17(a), a signal from the LE signal memory regenerator 32 assumes a staircase form corresponding to a count value t of an FG signal as shown in FIG. 17(b). At this point, a rising edge portion or a trailing edge portion of steps of the staircase waveform of the signal from the LE signal memory regenerator 32 includes a high-frequency band signal component. Therefore, even when a difference between both signals is obtained by the subtractor 35, the signal waveform of the difference assumes a staircase form.

Meanwhile, as shown in FIG. 16(b), the LE signal filter 37 for performing lens control is configured as a PID filter in which a proportional filter 37a, an integral filter 37b and a differential filter 37c respectively perform a proportional operation, an integral operation and a differential operation in parallel on an input signal.

When a signal from the subtractor 35 which includes a component of a staircase waveform signal is inputted to a PID filter arranged as described above, a drive signal generated after processing also assumes to have a staircase waveform. However, due to the influence of the differential operation performed by the differential filter 37c of the LE signal filter 37, the drive signal is to be outputted to the drive circuit 73 as a signal having a noise-amplified waveform such as that shown in FIG. 17(c). At this point, drive noise appears as a distortion of a rising edge or a trailing edge of steps of the signal waveform.

Particularly, when the gain of the LE signal filter 37 is increased in order to follow an eccentricity of the optical disk 1 with high accuracy, drive noise increases and a risk exists that the threshold set to the drive circuit 73 and which is shown in the drawing is exceeded. When the threshold is exceeded, the drive circuit 73 may become saturated or reactive power may increase. A saturation of the drive circuit 73 causes the waveform of the drive current actually passing through the Tk actuator 15 to differ significantly from the original waveform and prevents stable eccentricity correction operations.

In addition, feedback control is operated using a signal from the LE signal generator 30 in order to perform lens control, but the following problem exists when the LE signal generator 30 uses a top hold push-pull method for detecting a lens shift amount. That is, when an optical beams crosses between tracks of an optical disk 1, and when the crossing speed of the optical beam with respect to tracks of the optical disk 1, i.e., the movement speed in a tracking direction is low, the influence of the reflected light from the tracks is not sufficiently eliminated and an error occurs in the LE signal from the LE signal generator 30. The error disturbs lens control and degrades following accuracy with respect to an eccentricity. A decline in following accuracy impedes stable eccentricity correction operations.

The present invention has been made to solve the problem described above, and an object thereof is to provide an optical disk apparatus and the like which performs stable eccentricity correction operations.

SUMMARY OF THE INVENTION

The $1^{st}$ aspect of the present invention is an optical disk apparatus comprising:
  a rotary drive unit which rotationally drives an information carrier;
  a rotational phase detection unit which detects a rotational phase of the information carrier;
  an optical head having a collecting unit which collects an optical beam on the information carrier;
  a lens position detection unit which detects a position of the collecting unit in the optical head as a position signal;
  a lens position storage unit which stores, in synchronization with a rotational phase to be detected by the rotational phase detection unit, the positional signal from the lens position detection unit corresponding to the rotational phase to be detected;

an output unit which outputs as a correction signal, in synchronization with a rotational phase to be detected by the rotational phase detection unit, the positional signal stored by the lens position storage unit and which has already been detected by the lens position detection unit;

a lens position correction unit which corrects the position signal detected by the lens position detection unit using the correction signal;

an eccentricity correction unit which generates a drive signal using a signal from the lens position correction unit and, based thereon, moves the collecting unit in a radial direction of the information carrier; and a high-frequency component reduction unit which reduces a high-frequency component of any of the correction signal, an output signal of the lens position correction unit and the drive signal.

The 2$^{nd}$ aspect of the present invention is the optical disk apparatus according to the 1$^{st}$ aspect of the present invention, wherein the high-frequency component reduction unit includes a low pass filter.

The 3$^{rd}$ aspect of the present invention is the optical disk apparatus according to the 1$^{st}$ aspect of the present invention, wherein the high-frequency component reduction unit differentiates the inputted signal and limits at least one of a maximum value and a minimum value to a predetermined level.

The 4$^{th}$ aspect of the present invention is the optical disk apparatus according to the 1$^{st}$ aspect of the present invention, wherein the high-frequency component reduction unit performs linear complementation on the inputted signal.

The 5$^{th}$ aspect of the present invention is the optical disk apparatus according to the 1$^{st}$ aspect of the present invention, wherein the output unit outputs the correction signal using a phase difference corresponding to a delay time occurred in the high-frequency component reduction unit.

The 6$^{th}$ aspect of the present invention is an optical disk apparatus comprising:

a rotary drive unit which rotationally drives an information carrier;

a rotational phase detection unit which detects a rotational phase of the information carrier;

an optical head having a collecting unit which collects an optical beam on the information carrier;

a lens position detection unit which detects a position of the collecting unit in the optical head as a position signal;

a lens position storage unit which stores, in synchronization with a rotational phase to be detected by the rotational phase detection unit, the positional signal from the lens position detection unit corresponding to the rotational phase to be detected;

an output unit which outputs as a correction signal, in synchronization with a rotational phase to be detected by the rotational phase detection unit, the positional signal stored by the lens position storage unit and which has already been detected by the lens position detection unit;

a lens position correction unit which corrects the position signal detected by the lens position detection unit using the correction signal; and an eccentricity correction unit which generates a drive signal using a signal from the lens position correction unit and, based thereon, moves the collecting unit in a radial direction of the information carrier, wherein the eccentricity correction unit generates the drive signal without performing a differential operation on a signal outputted from the lens position correction unit.

The 7$^{th}$ aspect of the present invention is the optical disk apparatus according to the 6$^{th}$ aspect of the present invention, wherein the eccentricity correction unit includes:

a differential filter which performs a differential operation on the position signal;

an integral proportional filter which performs at least one of a proportional operation and an integral operation on a signal outputted from the lens position correction unit; and an adder which adds the outputs of the differential filter and the integral proportional filter.

The 8$^{th}$ aspect of the present invention is an optical disk apparatus comprising:

a rotary drive unit which rotationally drives an information carrier;

a rotational phase detection unit which detects a rotational phase of the information carrier;

an optical head having a collecting unit which collects an optical beam on the information carrier;

a lens position detection unit which detects a position of the collecting unit in the optical head as a position signal;

a lens position storage unit which stores, in synchronization with a rotational phase to be detected by the rotational phase detection unit, the positional signal from the lens position detection unit corresponding to the rotational phase to be detected;

an output unit which outputs as a correction signal, in synchronization with a rotational phase to be detected by the rotational phase detection unit, the positional signal stored by the lens position storage unit and which has already been detected by the lens position detection unit;

a lens position correction unit which corrects the position signal detected by the lens position detection unit using the correction signal;

an eccentricity correction unit which moves the collecting unit in a radial direction of the information carrier based on a signal from the lens position correction unit;

a lens speed detection unit which detects a speed of the collecting unit; and an eccentricity correction operation suspension unit which suspends an operation of the eccentricity correction unit when speed information from the lens speed detection unit is equal to or lower than a predetermined level.

The 9$^{th}$ aspect of the present invention is the optical disk apparatus according to the 8$^{th}$ aspect of the present invention, wherein the lens speed detection unit detects a speed of the collecting unit crossing a track of the information carrier.

The 10$^{th}$ aspect of the present invention is the optical disk apparatus according to the 9$^{th}$ aspect of the present invention, wherein the lens speed detection unit includes a track cross detection which detects an optical beam having crossed the tracks of the information carrier and outputs the result of detection as an edge of a binarization signal, and the lens speed detection unit detects a speed of the collecting unit by measuring a cycle of a signal from the track cross detection unit.

The 11$^{th}$ aspect of the present invention is the optical disk apparatus according to the 8$^{th}$ aspect of the present invention, wherein the lens speed detection unit includes an optical head speed detection unit which detects a movement speed of an optical head including the collecting unit, and the lens speed detection unit estimates a speed of the collecting unit based on a signal from the optical head speed detection unit.

The 12th aspect of the present invention is the optical disk apparatus according to the 11th aspect of the present invention, wherein the optical head speed detection unit estimates a movement speed of the optical head based on a drive signal for moving the optical head during a search of a track of the information carrier.

The 13th aspect of the present invention is the optical disk apparatus according to the 8th aspect of the present invention, wherein
   the lens speed detection unit includes an optical head movement target retention unit which retains an optical head movement target speed profile during a search of a track of the information carrier, and
   the lens speed detection unit estimates a movement speed of the optical head based on a signal from the optical head movement target retention unit.

The 14th aspect of the present invention is the optical disk apparatus according to the 8th aspect of the present invention, wherein the lens speed detection unit estimates a speed of the collecting unit using the two values: a speed during a predetermined period upon the start or the finish of a track search operation of the information carrier; and a speed that is greater than the speed during a period other than the predetermined period.

The 15th aspect of the present invention is the optical disk apparatus according to the 8th aspect of the present invention, wherein the signal from the lens position detection unit is a top hold push-pull signal.

The 16th aspect of the present invention is the optical disk apparatus according to the 8th aspect of the present invention, wherein the eccentricity correction unit holds a DC level of a drive signal for moving the collecting unit upon receiving a suspension control from the eccentricity correction operation suspension unit.

The 17th aspect of the present invention is the optical disk apparatus according to the 8th aspect of the present invention comprising:
   a tracking error signal detection unit which detects a reflected signal from a recording track of the optical disk as a tracking error signal; and
   a tracking control unit which moves the collecting unit in a radial direction of the information carrier based on the tracking error signal, wherein
   the tracking control unit holds a DC level of a drive signal for moving the collecting unit when not performing the operation.

The 18th aspect of the present invention is an integrated circuit comprising the respective functions of a rotational phase detection unit which detects a rotational phase of the information carrier; a lens position storage unit which stores, in synchronization with a rotational phase to be detected by the rotational phase detection unit, the positional signal from the lens position detection unit corresponding to the rotational phase to be detected; an output unit which outputs as a correction signal, in synchronization with a rotational phase to be detected by the rotational phase detection unit, the positional signal stored by the lens position storage unit and which has already been detected by the lens position detection unit; a lens position correction unit which corrects the position signal detected by the lens position detection unit using the correction signal; an eccentricity correction unit which generates a drive signal using a signal from the lens position correction unit and, based thereon, moves the collecting unit in a radial direction of the information carrier; and a high-frequency component reduction unit which reduces a high-frequency component of any of the correction signal, an output signal as an inputted signal of the lens position correction unit and the drive signal of the optical disk apparatus according to the 1st aspect of the present invention.

The 19th aspect of the present invention is an integrated circuit comprising the respective functions of a rotational phase detection unit which detects a rotational phase of the information carrier; a lens position storage unit which stores, in synchronization with a rotational phase to be detected by the rotational phase detection unit, the positional signal from the lens position detection unit corresponding to the rotational phase to be detected; an output unit which outputs as a correction signal, in synchronization with a rotational phase to be detected by the rotational phase detection unit, the positional signal stored by the lens position storage unit and which has already been detected by the lens position detection unit; a lens position correction unit which corrects the position signal detected by the lens position detection unit using the correction signal; and an eccentricity correction unit which generates a drive signal using a signal from the lens position correction unit and, based thereon, moves the collecting unit in a radial direction of the information carrier of the optical disk apparatus according to the 6th aspect of the present invention.

The 20th aspect of the present invention is an integrated circuit comprising the respective functions of a rotational phase detection unit which detects a rotational phase of the information carrier; a lens position storage unit which stores, in synchronization with a rotational phase to be detected by the rotational phase detection unit, the positional signal from the lens position detection unit corresponding to the rotational phase to be detected; an output unit which outputs as a correction signal, in synchronization with a rotational phase to be detected by the rotational phase detection unit, the positional signal stored by the lens position storage unit and which has already been detected by the lens position detection unit; a lens position correction unit which corrects the position signal detected by the lens position detection unit using the correction signal; an eccentricity correction unit which generates a drive signal using a signal from the lens position correction unit and, based thereon, moves the collecting unit in a radial direction of the information carrier; a lens speed detection unit which detects a speed of the collecting unit; and an eccentricity correction operation suspension unit which suspends an operation of the eccentricity correction unit when speed information from the lens speed detection unit is equal to or lower than a predetermined level of the optical disk apparatus according to the 8th aspect of the present invention.

The 21st aspect of the present invention is a control method of an optical disk apparatus comprising:
   a step for rotationally driving an information carrier;
   a step for detecting a rotational phase of the information carrier;
   a step for detecting, in an optical head having a collecting unit which collects an optical beam on the information carrier, a position of the collecting unit as a position signal;
   a step for storing, in synchronization with a detected rotational phase, the positional signal from the lens position detection unit corresponding to the rotational phase to be detected;
   a step for outputting, in synchronization with a detected rotational phase, the stored and already detected positional signal as a correction signal;
   a step for correcting the detected position signal using the correction signal; and
   a step for generating a drive signal using the corrected position signal and, based thereon, moving the collecting unit in a radial direction of the information carrier, wherein the control method includes:

a step for reducing a high-frequency component of any of the correction signal, an output signal of the lens position correction unit and the drive signal.

The $22^{nd}$ aspect of the present invention is a control method of an optical disk apparatus comprising:

a step for rotationally driving an information carrier;

a step for detecting a rotational phase of the information carrier;

a step for detecting, in an optical head having a collecting unit which collects an optical beam on the information carrier, a position of the collecting unit as a position signal;

a step for storing, in synchronization with a detected rotational phase, the positional signal from the lens position detection unit corresponding to the rotational phase to be detected;

a step for outputting, in synchronization with a detected rotational phase, the stored and already detected positional signal as a correction signal;

a step for correcting the detected position signal using the correction signal; and a step for generating a drive signal using the corrected position signal and, based thereon, moving the collecting unit in a radial direction of the information carrier, wherein the control method generates the drive signal without performing a differential operation on the corrected position signal.

The $23^{rd}$ aspect of the present invention is a control method of an optical disk apparatus comprising:

a step for rotationally driving an information carrier;

a step for detecting a rotational phase of the information carrier;

a step for detecting, in an optical head having a collecting unit which collects an optical beam on the information carrier, a position of the collecting unit as a position signal;

a step for storing, in synchronization with a detected rotational phase, the positional signal from the lens position detection unit corresponding to the rotational phase to be detected;

a step for outputting, in synchronization with a detected rotational phase, the stored and already detected positional signal as a correction signal;

a step for correcting the detected position signal using the correction signal;

a step for generating a drive signal using the corrected position signal and, based thereon, moving the collecting unit in a radial direction of the information carrier;

a step for detecting a speed of the collecting unit; and a step for suspending an operation of the eccentricity correction unit when the detected speed information is equal to or lower than a predetermined level.

The $24^{th}$ aspect of the present invention is a program for causing a computer to perform the respective functions of a rotational phase detection unit which detects a rotational phase of the information carrier; a lens position storage unit which stores, in synchronization with a rotational phase to be detected by the rotational phase detection unit, the positional signal from the lens position detection unit corresponding to the rotational phase to be detected; an output unit which outputs as a correction signal, in synchronization with a rotational phase to be detected by the rotational phase detection unit, the positional signal stored by the lens position storage unit and which has already been detected by the rotational phase detection unit; a lens position correction unit which corrects the position signal detected by the lens position detection unit using the correction signal; an eccentricity correction unit which generates a drive signal using a signal from the lens position correction unit and, based thereon, moves the collecting unit in a radial direction of the information carrier; and a high-frequency component reduction unit which reduces a high-frequency component of any of the correction signal, an output signal of the lens position correction unit and the drive signal of the optical disk apparatus according to the $1^{st}$ aspect of the present invention.

The $25^{th}$ aspect of the present invention is a program for causing a computer to perform the respective functions of a rotational phase detection unit which detects a rotational phase of the information carrier; a lens position storage unit which stores, in synchronization with a rotational phase to be detected by the rotational phase detection unit, the positional signal from the lens position detection unit corresponding to the rotational phase to be detected; an output unit which outputs as a correction signal, in synchronization with a rotational phase to be detected by the rotational phase detection unit, the positional signal stored by the lens position storage unit and which has already been detected by the rotational phase detection unit; a lens position correction unit which corrects the position signal detected by the lens position detection unit using the correction signal; and an eccentricity correction unit which generates a drive signal using a signal from the lens position correction unit and, based thereon, moves the collecting unit in a radial direction of the information carrier of the optical disk apparatus according to the $6^{th}$ aspect of the present invention.

The $26^{th}$ aspect of the present invention is a program for causing a computer to perform the respective functions of a rotational phase detection unit which detects a rotational phase of the information carrier; a lens position storage unit which stores, in synchronization with a rotational phase to be detected by the rotational phase detection unit, the positional signal from the lens position detection unit corresponding to the rotational phase to be detected; an output unit which outputs as a correction signal, in synchronization with a rotational phase to be detected by the rotational phase detection unit, the positional signal stored by the lens position storage unit and which has already been detected by the rotational phase detection unit; a lens position correction unit which corrects the position signal detected by the lens position detection unit using the correction signal; an eccentricity correction unit which generates a drive signal using a signal from the lens position correction unit and, based thereon, moves the collecting unit in a radial direction of the information carrier; a lens speed detection unit which detects a speed of the collecting unit; and an eccentricity correction operation suspension unit which suspends an operation of the eccentricity correction unit when speed information from the lens speed detection unit is equal to or lower than a predetermined level of the optical disk apparatus according to the $8^{th}$ aspect of the present invention.

The $27^{th}$ aspect of the present invention is a storage medium storing the program according to the $24^{th}$ aspect of the present invention, wherein the storage medium is a computer-readable storage medium.

The $28^{th}$ aspect of the present invention is a storage medium storing the program according to the $25^{th}$ aspect of the present invention, wherein the storage medium is a computer-readable storage medium.

The $29^{th}$ aspect of the present invention is a storage medium storing the program according to the $26^{th}$ aspect of the present invention, wherein the storage medium is a computer-readable storage medium.

ADVANTAGE OF THE INVENTION

According to the present invention as described above, stable eccentricity correction operations can now be performed.

BRIEF DESCRIPTION OF THE DRAWINGS

FIG. 2(a) is a diagram showing an example of signal output from an LE signal generator 30 according to the first embodiment; (b) is a diagram showing an example of signal output from an LE signal memory regenerator 32 according to the first embodiment; and (c) is a diagram showing an example of signal output from an LE signal filter 37 according to the first embodiment;

DESCRIPTION OF SYMBOLS

Figure 1:
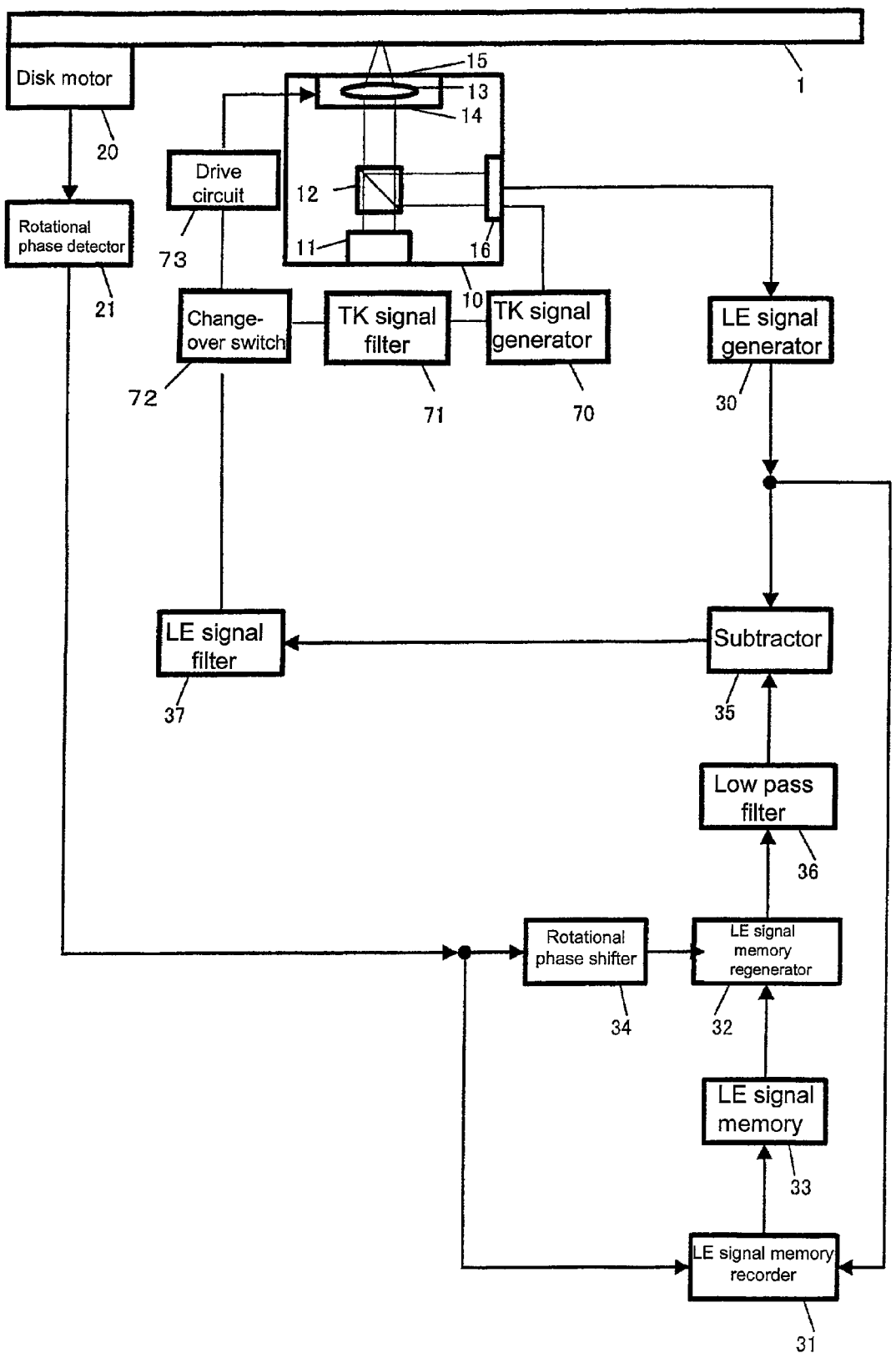
FIG. 1 is a diagram showing a block configuration of an optical disk apparatus according to a first embodiment.

1 Optical disk
10 Optical head
11 Semiconductor laser
12 Beam splitter
13 Collecting lens
14 Fc actuator
15 Tk actuator
16 Light detector
20 Disk motor
21 Rotational phase detector
30 LE signal generator
31 LE signal memory recorder
32 LE signal memory regenerator
33 LE signal memory
34 Rotational phase shifter
35 Subtractor
36 Low pass filter
37 LE signal filter
37a Proportional filter
37b Integral filter
37c Differential filter
37d Limiter
38 Integral proportional filter
39 Differential filter
40 Adder
50 Lens speed detector
51 Selector
52 TKC generator
60 Head move command
61 Parameter set command
62 Search instruction unit
63 Tracking control disable command
64 Lens control enable command
65 Tracking control enable command
66 Lens control disable command
68 Movement drive generator
70 TK signal generator
71 TK signal filter
72 Change-over switch
73 Drive circuit
74 Linear interpolator
75 Drive signal generation unit
80 Motor
80 Shaft
82 Speed control unit

DETAILED DESCRIPTION

Embodiments of the present invention will now be described.

First Embodiment

Operations of an optical disk apparatus that is a present first embodiment will be described with reference to FIG. 1. A block configuration of an optical disk apparatus that is the present first embodiment is shown in FIG. 1. However, components shown in FIG. 1 which are similar to those shown in FIGS. 16(a) and (b) that represent background art are assigned like reference numerals and descriptions thereof will be omitted. In addition, a low pass filter 36 is an instrument provided between an LE signal memory regenerator 32 and a subtractor 35, which cuts off a high-frequency component of an output signal from the LE signal memory regenerator 32 and outputs the same to the subtractor 35.

Incidentally, in the configuration described above, the rotational phase detector 21 corresponds to the rotational phase detection unit according to the present invention and the collecting lens 13 corresponds to the collecting unit according to the present invention. In addition, the LE signal generator 30 corresponds to the lens position detection unit according to the present invention, the LE signal memory 33 and the LE signal memory recorder 31 correspond to the lens position storage unit according to the present invention, and the rotational phase shifter 34 and the LE signal memory regenerator 32 correspond to the output unit according to the present invention. Furthermore, the subtractor 35 corresponds to the lens position correction unit according to the present invention, the LE signal filter 37, the drive circuit 73 and the Tk actuator 15 correspond to the eccentricity correction unit according to the present invention, and the low pass filter 36 corresponds to the high-frequency component reduction unit and the low pass filter according to the present invention.

A description will now be given on operations of an optical disk apparatus according to the first embodiment of the present invention configured as described above, which, in turn, will describe an embodiment of operations of a control method of an optical disk apparatus according to the present invention.

Figure 16A:
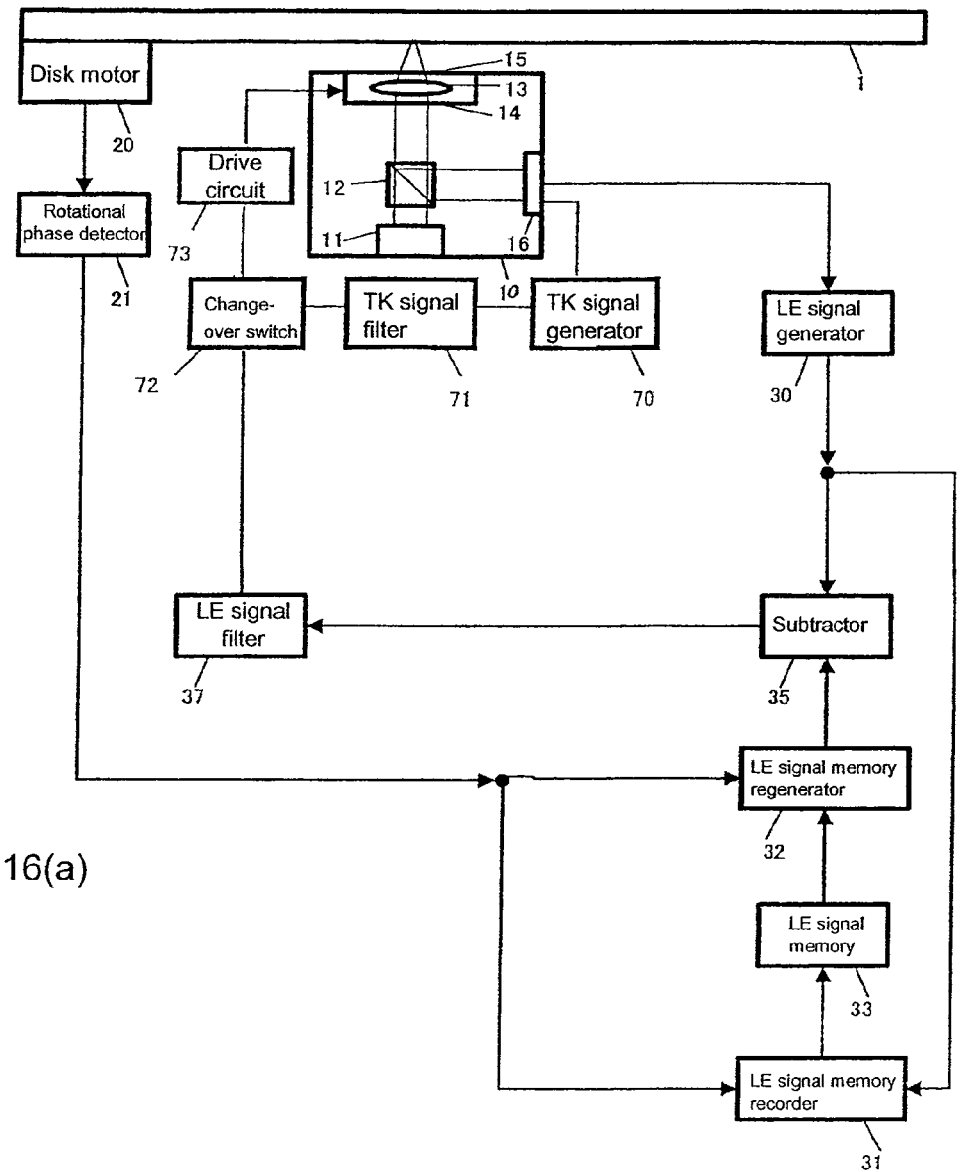
FIG. 16(a) is a diagram showing a block configuration of an optical disk apparatus described in Background Art, and (b) is a diagram showing a configuration of the LE signal filter 37 in the optical disk apparatus described in Background Art.

Operations of basic lens control are the same as the background art shown in FIG. 16(a). That is, the rotational phase detector 21 counts FG signals from the disk motor 20 and generates a rotational phase of the optical disk 1 as a discrete value, and sends the same as rotational phase information to the rotational phase shifter 34 and the LE signal memory recorder 31.

Next, upon receiving an input of rotational phase information from the rotational phase detector 21, the rotational phase shifter 34 sends the same to the LE signal memory regenerator 32 as corrected rotational phase information that has been shifted so as to lag or lead by a predetermined amount.

In synchronization with a change in the corrected rotational phase information from the rotational phase shifter 34, the LE signal memory regenerator 32 sends an LE signal whose level corresponds to the rotational phase from the LE signal memory 33 to the low pass filter 36.

Upon receiving input of a signal from the LE signal memory regenerator 32, the low pass filter 36 reduces the high-frequency component and sends the signal to the subtractor 35.

Operations of stages subsequent to the subtractor 35 are performed in the same manner as in Background Art. That is, upon receiving a signal from the subtractor 35, the LE signal filter 37 generates a drive signal whose target value is the stored information of the LE signal memory 33. The drive circuit 73 receives the drive signal and passes a current through the Tk actuator 15, and moves the Tk actuator 15 in a tracking direction. Consequently, the optical beam operates so as to follow the eccentricity of the optical disk 1.

In the operations described above, the optical disk apparatus according to the present embodiment attenuates the high-frequency component of the signal from the LE signal memory regenerator 32 by providing the low pass filter 36 between the LE signal memory regenerator 32 and the subtractor 35.

The reason therefor is as follows. That is, as described in Background Art, an output signal from the subtractor 35 includes a signal from the LE signal memory regenerator 32 which is given as a discrete value and therefore includes a high-frequency band signal component which is then amplified by differential processing performed by the LE signal filter 37 using a PID filter and incorporated into the drive signal as a drive noise.

In contrast, with the present embodiment, a high-frequency band signal component is attenuated in advance by passing the output from the subtractor 35 through the low pass filter 36.

As described in Background Art, while the LE signal shown in FIG. 2(a) is a continuous quantity, the signal from the LE signal memory regenerator 32 shown in FIG. 2(b) is a discrete value. Therefore, an output signal of the subtractor 35 that is the difference of these signals also assumes to have a staircase waveform. This has been a cause of a high-frequency component being amplified as noise during the generation of a drive signal by the LE signal filter 37.

The high-frequency band component included in a signal outputted from the subtractor 35 is reduced by passing through the low pass filter 36 in advance. Therefore drive noise amplified by a differential operation of the differential filter 37c is also reduced. Therefore, as shown in FIG. 2(c), the signal from the LE signal filter 37 assumes a drive waveform whose noise has been reduced until below a threshold set to the drive circuit 73.

Figure 3A:
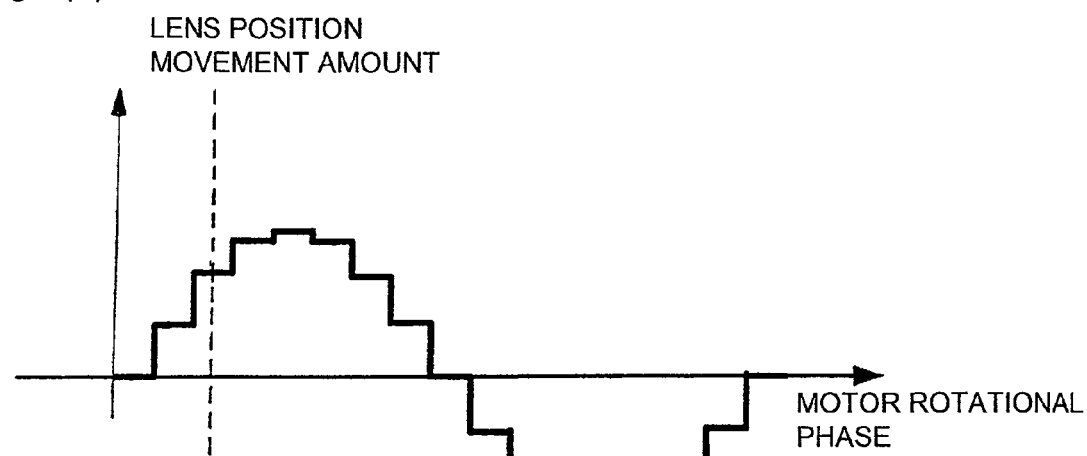
FIG. 3(a) is a diagram showing an example of a signal after passing through a low pass filter 36 according to the first embodiment, and (b) is a diagram showing an example of signal output from the LE signal generator 30 according to the first embodiment.
Figure 3B:
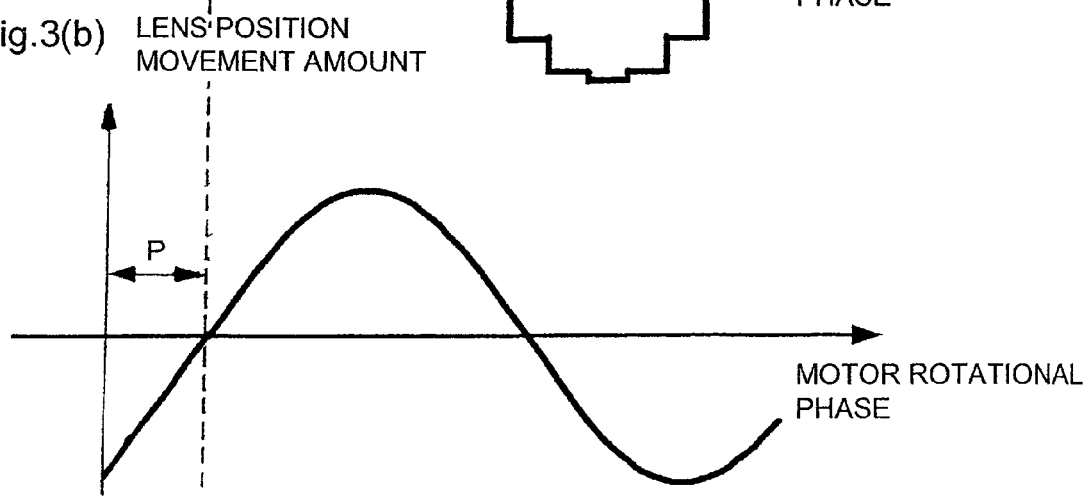

On the other hand, while the use of the low pass filter 36 reduces the high-frequency band component included in signals subsequent to the subtractor 35, a time delay occurs. In the signal after passing through the low pass filter 36 shown in FIG. 3(a), a phase difference P has occurred with respect to the LE signal from the LE signal generator 30 shown in FIG. 3(b).

The rotational phase shifter 34 is provided in order to accommodate the phase difference, and upon receiving rotational phase information from the rotational phase detector 21, outputs the rotational phase information advanced by precisely the phase difference P as corrected rotational phase information to the LE signal memory regenerator 32. The LE signal memory generator 32 outputs the signal from the LE signal memory in synchronization with the corrected rotational phase information. While the output signal leads the LE signal shown in FIG. 3(b) by precisely the phase difference P, the phase difference becomes 0 at the moment of input to the subtractor 35 due to a delay of the low pass filter 36. In this manner, the rotational phase shifter 34 imparts a phase difference in a direction toward which the inputted rotational phase is advanced in accordance with the delay time at the low pass filter 36. Accordingly, a signal having passed through the low pass filter 36 is able to maintain proper synchronization.

As described above, with the optical disk apparatus according to the present embodiment, the high-frequency band component is removed before the signal passing through the LE signal filter 37, drive noise during eccentricity correction can be reduced to prevent saturation of the drive circuit 73 and stabilize eccentricity correction operations.

Figure 4:
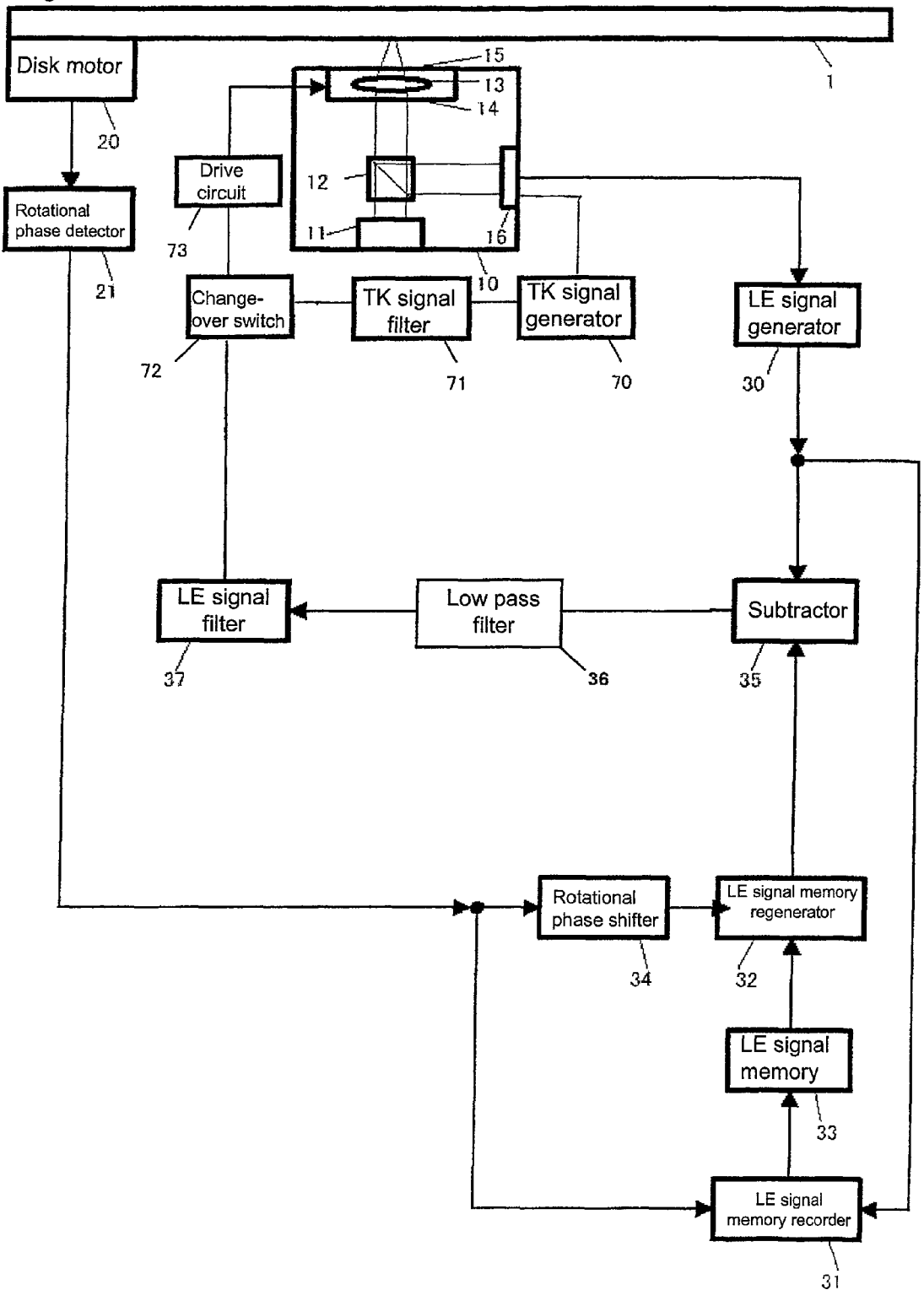
FIG. 4 is a diagram showing a block configuration of another example of the optical disk apparatus according to the first embodiment.

Incidentally, while the present first embodiment is configured so that the low pass filter 36 for reducing a high-frequency band component is provided before the subtractor 35, the low pass filter 36 may instead be provided between the subtractor 35 and the LE signal filter 37 as is the case with the configuration example shown in FIG. 4.

In addition, although the low pass filter 36 is an example of the high-frequency component reduction unit according to the present invention, the configuration of the high-frequency component reduction unit according to the present invention is not limited to the configuration described above.

Figure 5:
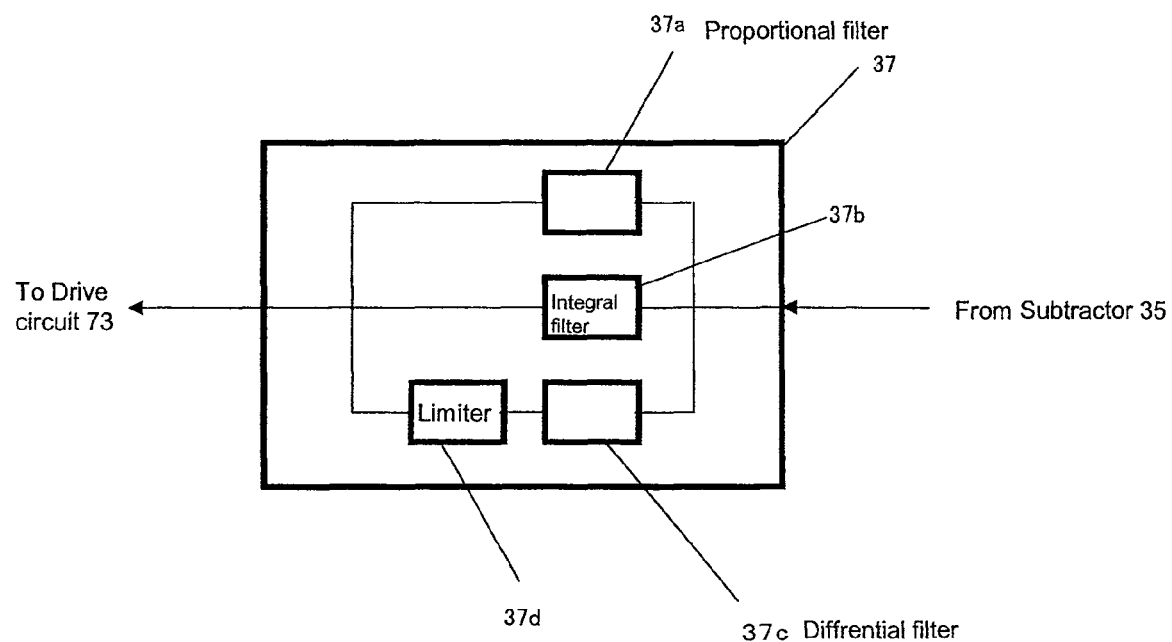
FIG. 5 is a diagram showing a block configuration of the LE signal filter 37 in another example of the optical disk apparatus according to the first embodiment.

FIG. 5 is a diagram showing another configuration example of the high-frequency component reduction unit. The configuration shown in FIG. 5 is characterized in that a limiter 37d is provided inside the LE signal filter 37 at a stage subsequent to the differential filter 37c.

With the above-described configuration, at the LE signal filter 37, a signal from the LE signal memory regenerator 32 is subjected to a differential operation at the differential filter 37c and then passed through the limiter 37d, thereby limiting at least one of a maximum value and a minimum value of the signal. In this case, a drive noise appearing in a rising edge portion or a trailing edge portion of the staircase form of the drive signal created after the differential operation is cut off. By designing the cut criterion so as to equal or fall below the threshold of the drive circuit 73, the noise of the drive signal can be kept to or below a certain level. In this case, the optical disk apparatus is to be configured without the low pass filter 36 shown in FIG. 1.

Incidentally, although the LE signal filter 37 has been described with reference to FIG. 5 to be configured so that the proportional filter 37a, the integral filter 37b and the differential filter 37c respectively operate in parallel, a configuration in which the integral filter 37b is serially connected to a subsequent stage of the differential filter 37c is also possible. In this case, the limiter 37d is to be provided between the differential filter 37c and the integral filter 37b. In essence, as long as a limit can be imposed on an output immediately following an operation of the differential filter 37c, the limiter 37d is not restricted by the arrangement of the respective filters in the LE signal filter 37. Furthermore, the limiter 37d may instead be provided between the LE signal filter 37 and the change-over switch 72.

Figure 6:
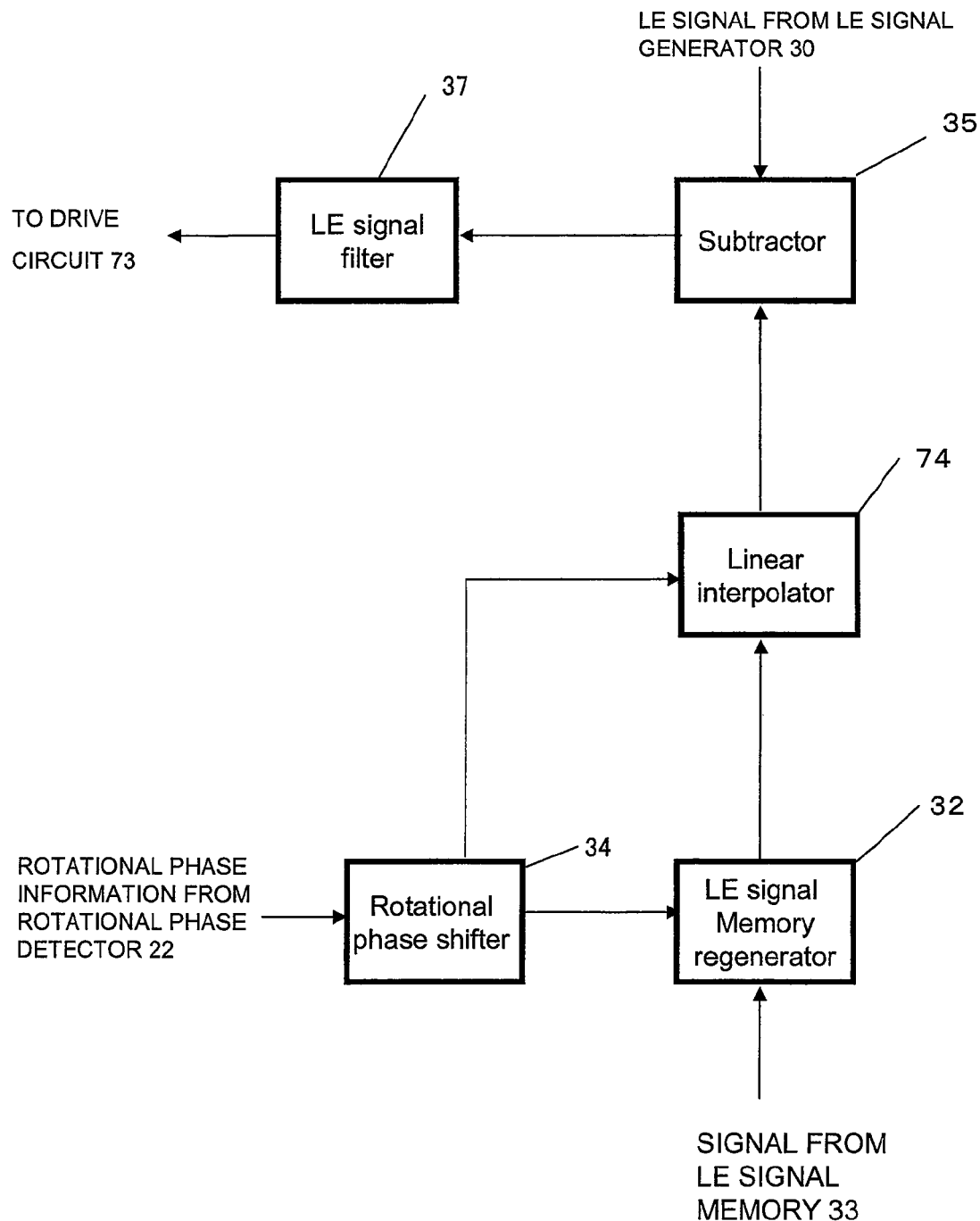
FIG. 6 is a diagram showing a block configuration of substantial parts in another example of the optical disk apparatus according to the first embodiment.

Moreover, FIG. 6 is a diagram showing another configuration example of the high-frequency component reduction unit. FIG. 6 is a diagram showing substantial parts of the optical disk apparatus according to the present embodiment and is a configuration in which a linear interpolator 74 is provided between the subtractor 35 and the LE signal filter 37. Incidentally, similar to the configuration example shown in FIG. 5, the configuration does not include the low pass filter 36.

Figure 7:
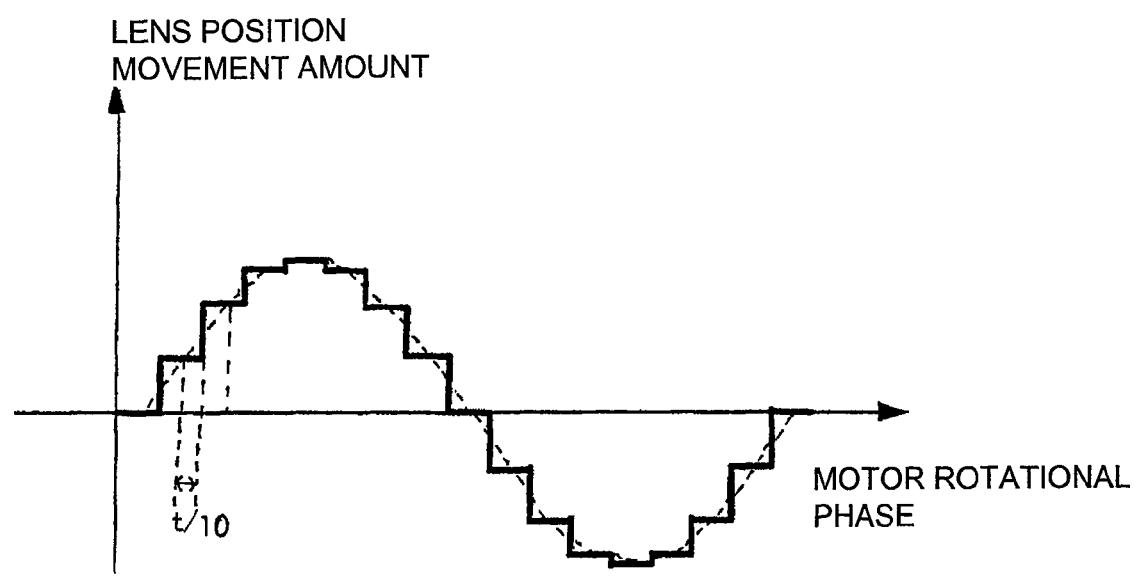
FIG. 7 is a diagram showing an example of signal output from the LE signal filter 37 in another example of the optical disk apparatus according to the first embodiment.

Upon acquiring corrected rotational phase information from the rotational phase shifter 34, the linear interpolator 74 multiplies and segmentalizes the information. The staircase waveform of the signal outputted from the subtractor 35 is linearly interpolated for each segment of the segmentalized corrected rotational phase information. As an example of the output of the linear interpolator 74, FIG. 7 shows an LE signal in the case where linear interpolation is performed by multiplying by t/10 that is a value equal to 1/10 of a count value t of the FG signal. As shown in FIG. 7, smoothing due to linear interpolation to a level where the steps of the staircase waveform are ignorable also smoothes the steps of the signal waveforms of signals subsequent to the computing unit 35 and a drive noise in a rising edge portion or a trailing edge portion is reduced even when differential operation processing is performed by the LE signal filter 37. Incidentally, the multiplication value is not limited to the example shown in FIG. 7, and any value shall suffice which is capable of shaping the staircase waveform so that the drive noise after the differential operation is reduced to or below the threshold set to the drive circuit 73.

In addition, while the above description has been given on an optical disk apparatus, the present invention may also be realized as an integrated circuit in which the respective units of the rotational phase detector 21, the LE signal memory 33 and the LE signal memory recorder 31, the rotational phase shifter 34 and the LE signal memory regenerator 32, the subtractor 35, the LE signal filter 37, and the low pass filter 36 (or the limiter 37d or the linear interpolator 74) are integrally formed on the same semiconductor substrate and which is provided with the respective functions thereof.

Second Embodiment

Figure 8:
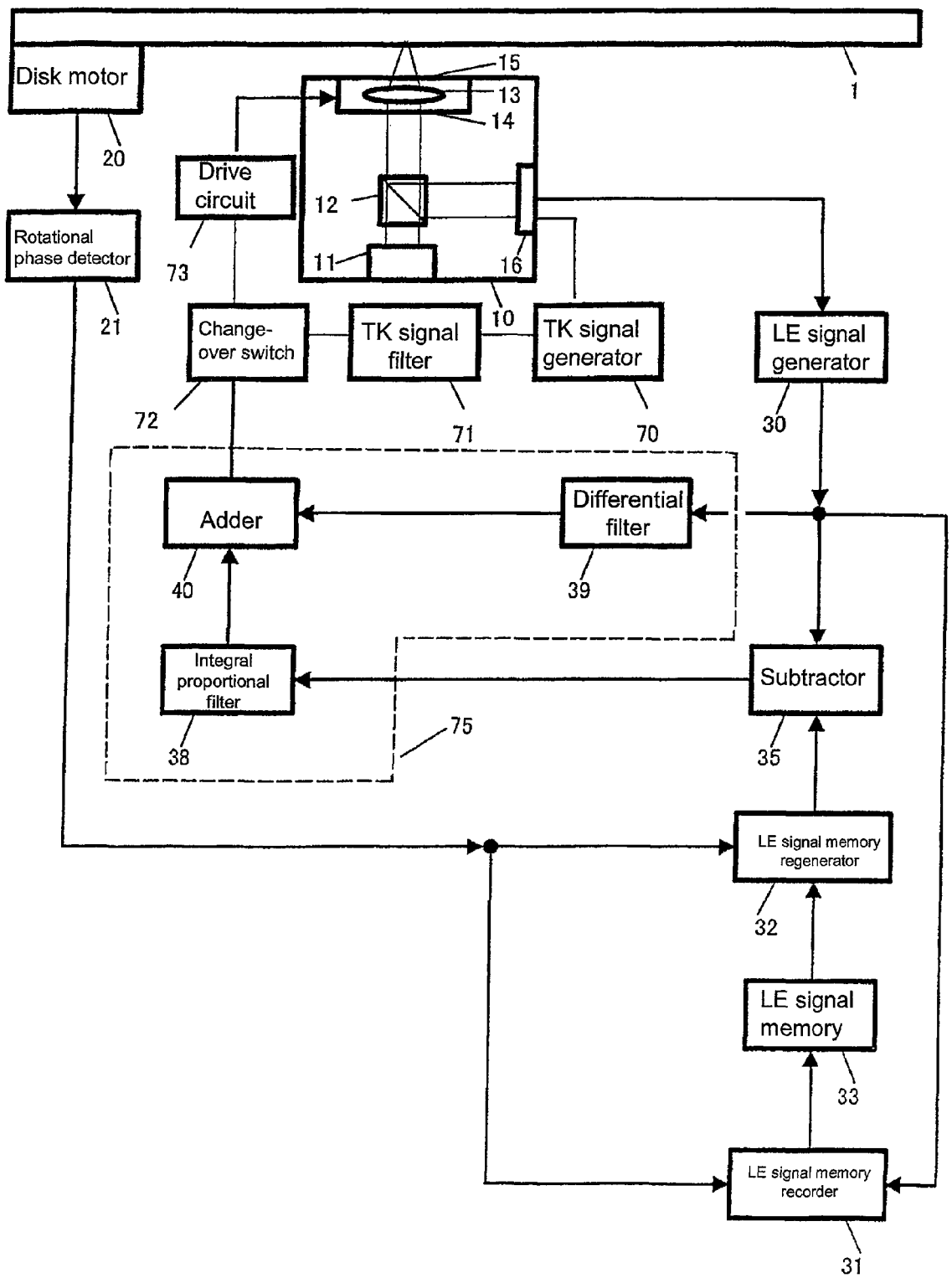
FIG. 8 is a diagram showing a block configuration of the optical disk apparatus according to a second embodiment.
Figure 16B:
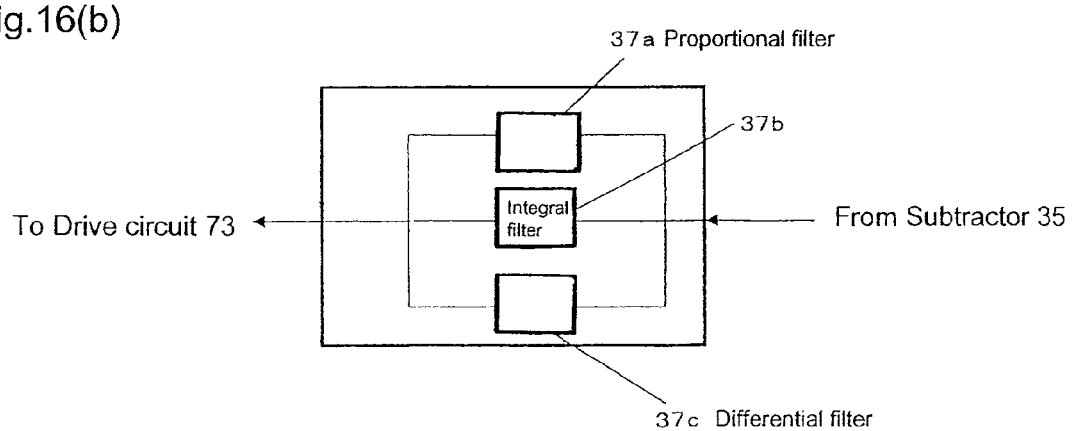
Figure 17A:
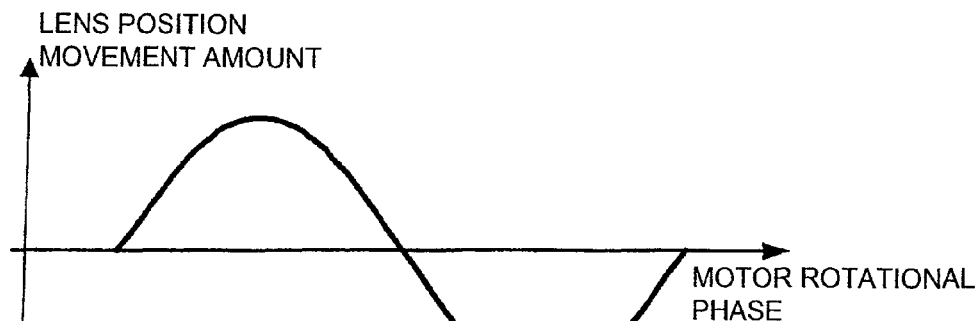
FIG. 17(a) is a diagram showing an example of signal output from the LE signal generator 30 described in Background Art; (b) is a diagram showing an example of signal output from the LE signal memory regenerator 32 described in Background Art, and (c) is a diagram showing an example of signal output from the LE signal filter 37 described in Background Art.
Figure 17B:
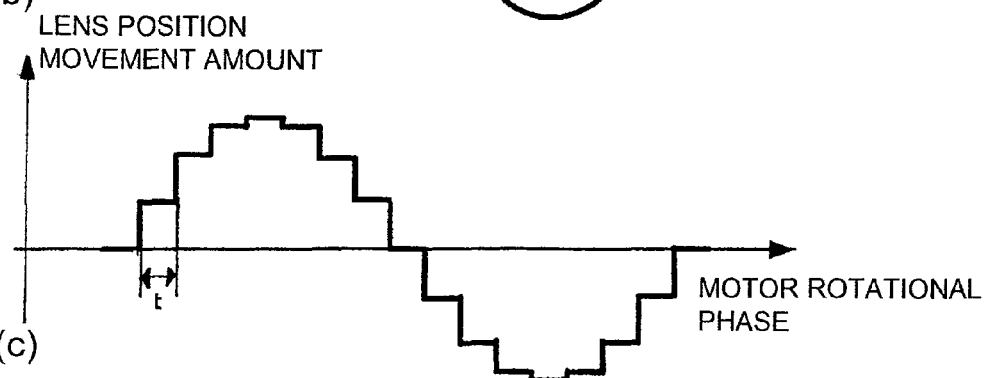
Figure 17C:
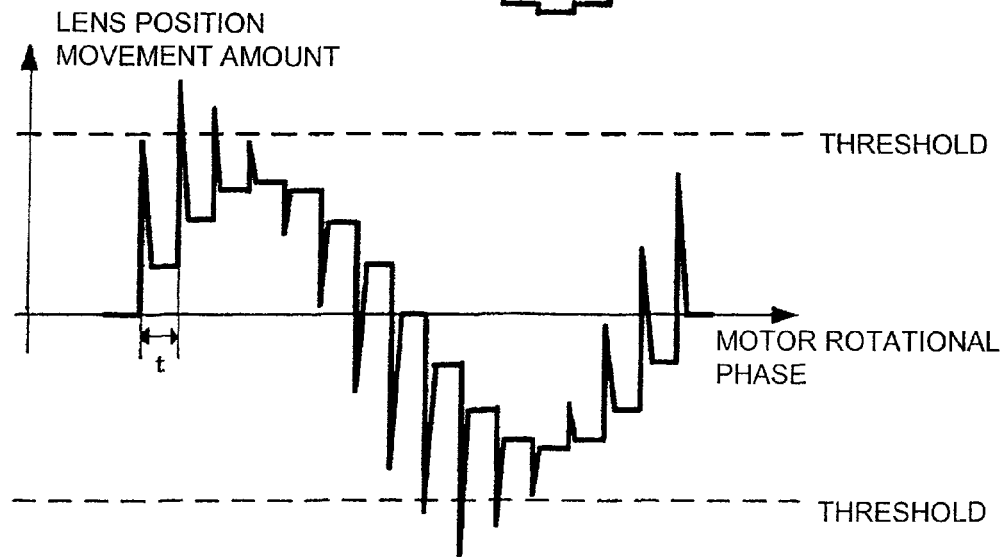

Operations of an optical disk apparatus that is a second embodiment of the present invention will be described with reference to FIG. 8. A block configuration of an optical disk apparatus that is the present second embodiment is shown in FIG. 8. However, components shown in FIG. 8 which are similar to those shown in FIG. 16 representing background art are assigned like reference numerals and descriptions thereof will be omitted.

In place of the LE signal filter 37 of the first embodiment, the optical disk apparatus according to the present embodiment is provided with a drive signal generation unit 75 comprising a differential filter 39, an integral proportional filter 38 and an adder 40.

While the drive signal generation unit 75 has the same functions as the LE signal filter 37, the drive signal generation unit 75 inputs an LE signal from the LE signal generator 30 directly to the differential filter 39, inputs a correction signal from the subtractor 35 directly to the integral proportional filter 38, and respectively performs a differential operation and an integral operation and a proportional operation at each filter.

Incidentally, the drive signal generation unit 75, the drive circuit 73 and the Tk actuator 15 constitute the eccentricity correction unit according to the present invention. In addition, the differential filter 39 corresponds to the differential filter according to the present invention, the integral proportional filter 38 corresponds to the integral proportional filter according to the present invention, and the adder 40 corresponds to the adder according to the present invention.

While operations of basic lens control of the optical disk apparatus according to the second embodiment configured as described above is the same as the first embodiment, the second embodiment is characterized in that the drive signal generation unit 75 only inputs an LE signal from the LE signal generator 30 to the differential filter 39.

As described in Background Art, a drive noise in a drive signal is occurred when performing a differential operation on a signal based on a signal from the LE signal memory regenerator 32 which is a discrete quantity and is a signal having a staircase waveform including rising edge portions and trailing edge portions.

In contrast, in the present embodiment, while the differential filter 39 performs a differential operation on an LE signal from the LE signal generator 30 as described above, the LE signal is a continuous quantity having a smooth waveform and does not include a high-frequency component. Therefore, distortions of the rising edge portions and trailing edge portions do not occur even when a differential operation is performed.

On the other hand, although an output signal from the subtractor 35 includes a signal from the LE signal memory regenerator 32 which is given as a discrete value and therefore includes a high-frequency band signal component and assumes a staircase waveform, since an integral operation and a proportional operation do not influence the high-frequency band signal component, no distortion occurs in the shape of the output signal from the integral proportional filter 38.

Figure 9A:
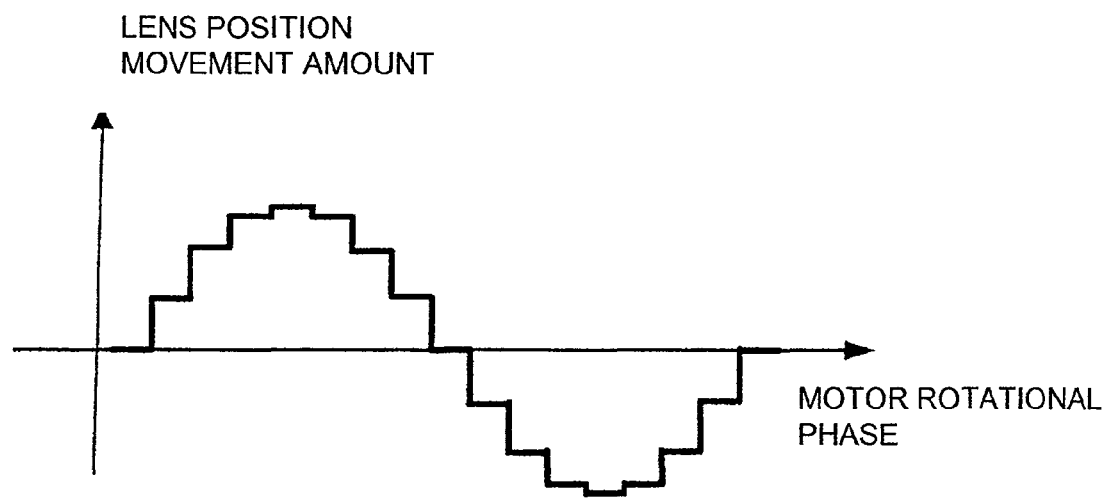
FIG. 9(a) is a diagram showing an example of signal output from the LE signal memory regenerator 32 according to a second embodiment, and (b) is a diagram showing an example of signal output from an adder 40 according to the second embodiment.
Figure 9B:
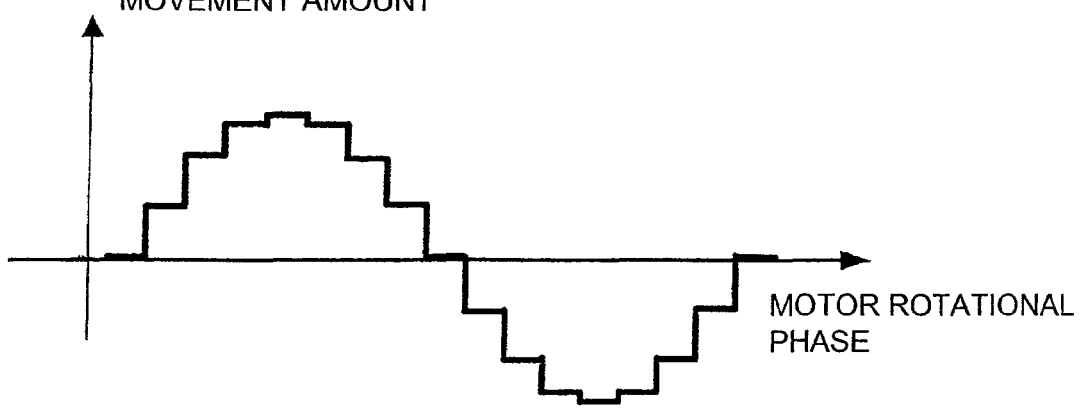

Therefore, with respect to a signal waveform from the LE signal memory regenerator 32 shown in FIG. 9(a), a distortion-suppressed waveform can be obtained as a drive signal from the adder 40 shown in FIG. 9(b).

As described above, according to the optical disk apparatus of the present embodiment, by providing a configuration in which a differential operation is not performed on a signal based on the LE signal memory regenerator 32, the drive noise of eccentricity correction can be reduced.

Incidentally, while a configuration provided with the differential filter 39, the integral proportional filter 38 and the adder 40 as the drive signal generation unit 75 has been described above, a configuration without the differential filter 39 is also possible. In this case, there is an advantage that overall downsizing can be achieved when downsizing the drive signal generation unit 75 and implementing the present invention as an integrated circuit to be described later. In addition, a configuration is also possible in which a limiter having the same function as the limiter 37d of the first embodiment is provided at a subsequent stage of the adder 40, whereby rising edge portions or trailing edge portions of a drive signal are cut off. Even when a distortion occurs due to a differential operation by the differential filter 39, the distortion can be reduced.

In addition, while the above description has been given on an optical disk apparatus, the present invention may also be realized as an integrated circuit in which the respective units of the rotational phase detector 21, the LE signal memory 33 and the LE signal memory recorder 31, the rotational phase shifter 34 and the LE signal memory regenerator 32, the subtractor 35 and the drive signal generation unit 75 are integrally formed on the same semiconductor substrate and which is provided with the respective functions thereof.

Third Embodiment

An optical disk apparatus according to a third embodiment of the present invention enables lens control to be performed in a stable manner even when a movement speed of the optical head in a tracking direction decreases. A description will now be given with reference to FIG. 10.

Figure 10:
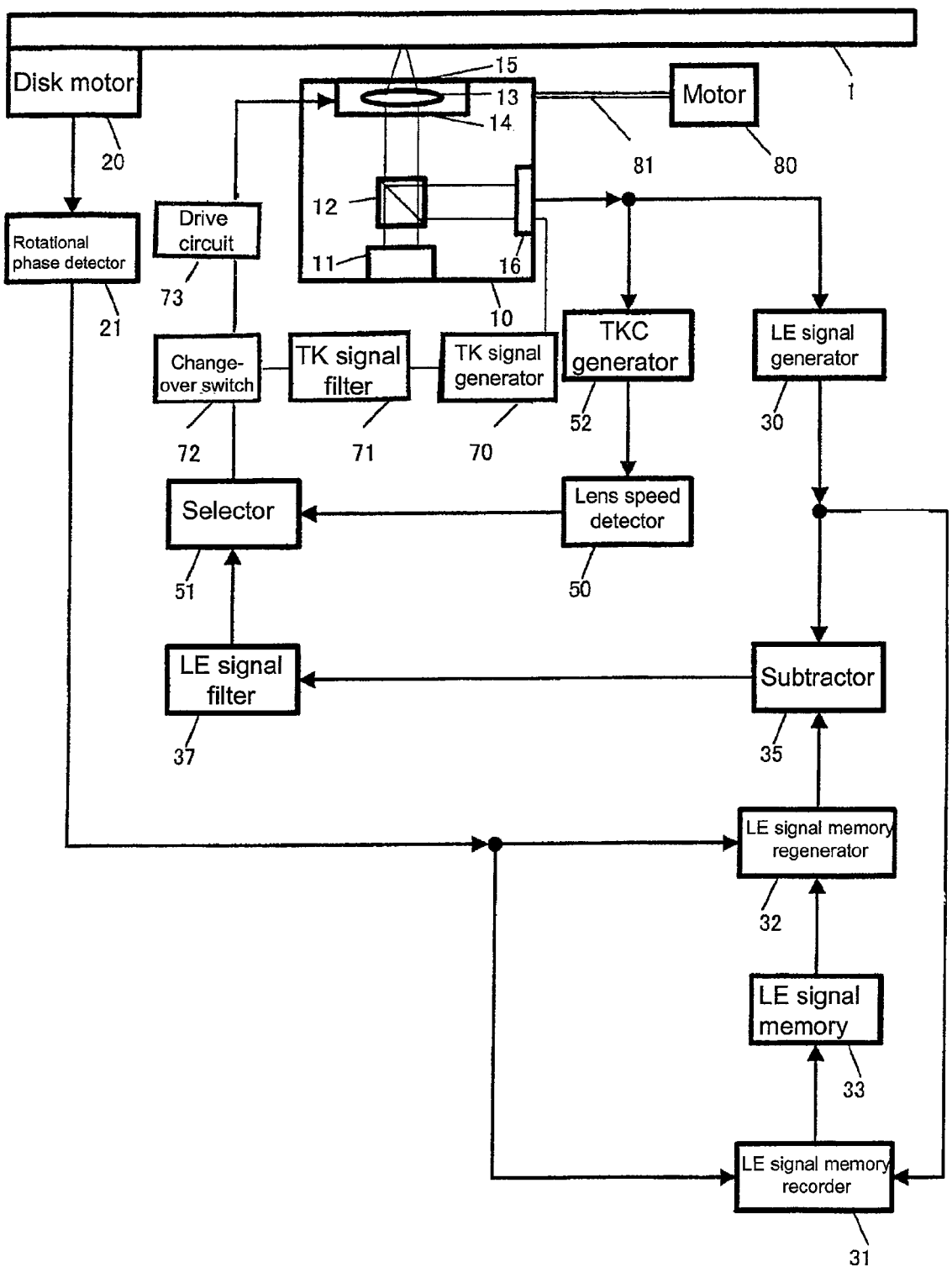
FIG. 10 is a diagram showing a block configuration of an optical disk apparatus according to a third embodiment.

A block configuration of an optical disk apparatus that is the present third embodiment is shown in FIG. 10. However, components shown in FIG. 10 which are similar to those shown in FIG. 16 representing background art are assigned like reference numerals and descriptions thereof will be omitted. A motor 80 is an instrument which moves the optical head 10 in a tracking direction of the optical disk 1 along a shaft 81. In addition, a TKC generator 52 is an instrument which generates, based on a light reception signal of the light detector 16, a TKC (track cross) signal occurring when an optical beam from the collecting lens 13 crosses tracks of the optical disk 1, a lens speed detector 50 is an instrument which detects a speed of the collecting lens 13 based on the TKC signal, and the selector 51 is an instrument which selects whether an output signal from the LE signal filter 37 is to be outputted to the drive circuit 73 side based on a detection result of the lens speed detector 50. Incidentally, the motor 80 and the shaft 81 are known technical instruments and, needless to say, are provided even if not explicitly shown in the background art shown in FIG. 16 or in the other embodiments.

Incidentally, in the configuration described above, the TKC generator 52 and the lens speed detector 50 correspond to the lens speed detection unit according to the present invention and the selector 51 corresponds to the eccentricity correction operation suspension unit according to the present invention. In addition, the TKC generator 52 corresponds to the track cross detection unit according to the present invention.

A description will now be given on operations of an optical disk apparatus according to the third embodiment of the present invention configured as described above, which, in turn, will describe an embodiment of operations of a control method of an optical disk apparatus according to the present invention.

When tracking control using a tracking error signal based on an operation of the TE signal generator 70 and the like is cancelled and the optical head 10 driven by the motor 80 starts to move in a tracking direction, the TKC generator 52 detects an optical beam having passed an edge of a track of the optical disk 1 by using a signal from the light detector 16, generates a TKC signal having an edge of a binarization signal and sends the generated signal to the lens speed detector 50.

The lens speed detector 50 measures a cycle of the TKC signal from the TKC generator 52, and detects a lens speed based thereon and sends the detected speed to the selector 51.

At the selector 51, a value having a predetermined level to become a criterion of judging operations is set. Upon receiving an input of the lens speed from the lens speed detector 50, a binary judgment is performed where the lens speed is compared to a set speed value. When the lens speed is equal to or lower than a predetermined level, a direct current having a voltage value of 0 is sent to the Tk actuator 15 as a drive current. Consequently, since the drive signal from the LE signal filter 37 is blocked and the drive signal will be held at DC level 0, the Tk actuator 15 is not activated. When the lens speed from the lens speed detector 50 is greater than a value of a predetermined level, the drive signal from the LE signal filter 37 is sent without modification to the Tk actuator 15.

Due to the operations described above, lens control based on a LE signal is executed only when the lens speed is greater than a predetermined level. As a result, the following advantage is achieved.

Figure 11A:
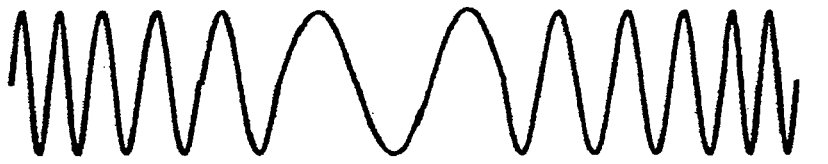
FIG. 11(a) is a diagram showing an example of signal output from a light detector 16 according to the third embodiment; (b) is a diagram showing an example of signal output from the LE signal generator 30 according to the third embodiment; (c) is a diagram showing an example of signal output from a TKC generator 52 according to the third embodiment; (d) is a diagram showing an example of an operational state of a selector 51 according to the third embodiment; and (e) is a diagram showing another example of an operational state of the selector 51 according to the third embodiment.
Figure 11B:
Figure 11C:
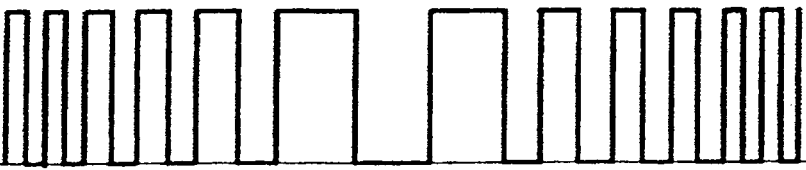
Figure 11D:
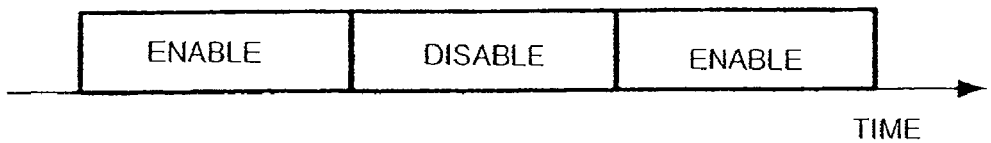
Figure 11E:
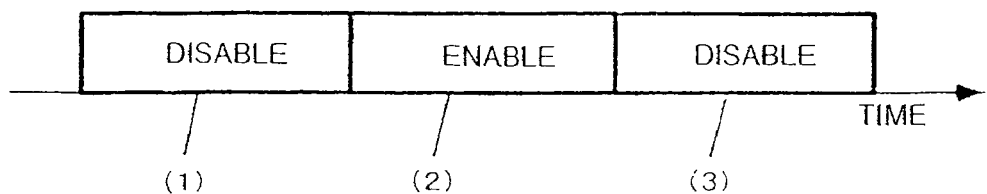

FIGS. 11(a) to (d) are diagrams showing an example of a change in signal output from respective units of an optical disk apparatus according to the present embodiment on the same temporal axis. FIG. 11(a) shows an output of a signal from the light detector 16, FIG. 11(b) shows an output of a signal from the LE signal generator 30, and FIG. 11(c) shows an output of a signal from the TKC generator 52. FIG. 6(a) shows a connection state of the selector 51.

Due to the crossing of the optical beam with respect to tracks of the optical disk 1, as shown in FIG. 11(a), the signal from the light detector 16 has a sinusoidal waveform in accordance to the crossing speed.

Since a lens shift amount with respect to the optical head 10 of the collecting lens 13 appears as a change in the DC level shown in FIG. 11(a), the signal of the LE signal generator 30 assumes to have a waveform such as that shown in FIG. 11(b) due to the top hold push-pull method.

At this point, when the crossing speed of the optical beam with respect to tracks of the optical disk 1 is low, a droop of the top hold circuit causes a detection deviation. The signal from the TKC generator 52 has a waveform such as that shown in FIG. 11(c), and an edge appears as a result of the crossing of the optical beam with respect to tracks of the optical disk 1.

The lens speed detector 50 detects a crossing speed of the optical beam with respect to tracks of the optical disk 1 by measuring the time between edges of FIG. 11(c), and when the crossing speed is equal to or lower than a predetermined level, blocks the signal from the LE signal filter 37.

As described in Background Art, the accuracy of an LE signal obtained from the LE signal generator 30 using the top hold push-pull method is dependent on the movement speed of the optical beam in a tracking direction, and is likely to include errors when the speed is low. Therefore, lens control based on an LE signal including such errors deteriorates following accuracy and prevents stable operations.

In contrast, in the present embodiment, following accuracy is increased by suspending lens control when the movement speed of the optical beam in a tracking direction is low.

Contrary to the examples shown in FIGS. 11(*a*) to (*d*), in actual tracking control, when differentiating the tracking direction movement speed of an optical beam in an optical disk into (1) start of movement, (2) during movement and (3) end of movement, the speed is low in the case of (1) and (3) and high in the case of (2).

Among the above, since period (1) is a period in which the optical beam departs from a predetermined track and starts moving towards a target track, the accuracy of eccentricity correction is not considered particularly important. In addition, with period (3), after arriving on the target track, since the optical beam is placed under tracking control using a TE signal which is more accurate than lens control, an eccentricity correction operation is accomplished without having to rely on lens control.

Therefore, as shown in FIG. 11(*e*), by disabling lens control during periods (1) and (3) and enabling lens control during period (2), the accuracy of lens control during movement between tracks in (2) can be increased and stability of eccentricity correction operations can be secured.

As described above, according to the present embodiment, when the speed of the optical beam with respect to tracks of the optical disk 1 is low, lens wobbling can be reduced by suspending lens control using an LE signal.

Incidentally, in the above description, while the speed of the optical beam with respect to tracks of the optical disk 1 has been detected using the TKC generator 52 and the lens speed detector 50, the configuration of the lens speed detection unit according to the present invention is not limited thereto.

Figure 12:
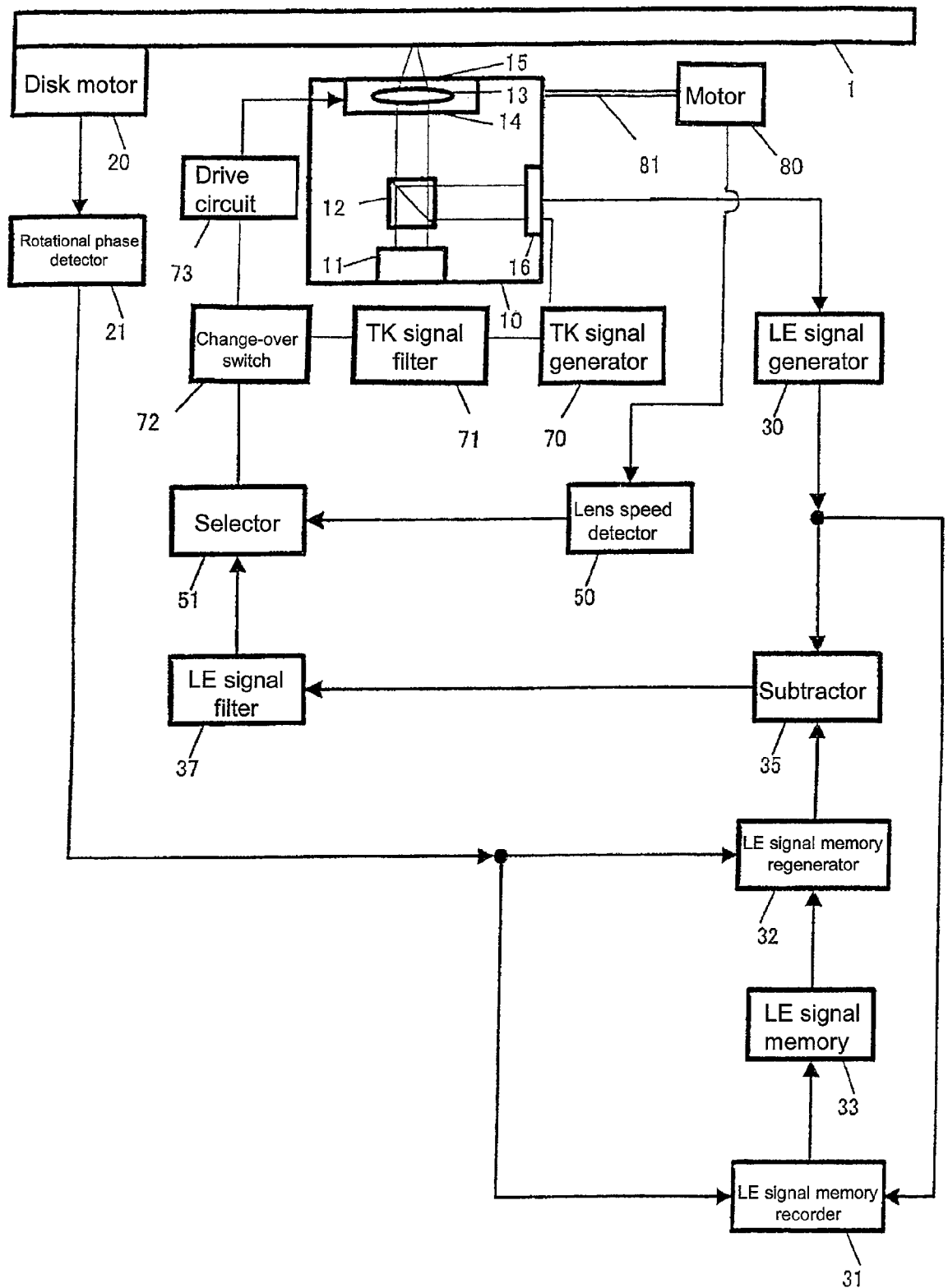
FIG. 12 is a diagram showing a block configuration of another example of an optical disk apparatus according to the third embodiment.

FIG. 12 is a diagram showing another configuration example of an optical disk apparatus according to the present third embodiment. With FIG. 12, the TKC generator 52 has been eliminated and the lens speed detector 50 is arranged to acquire a drive current of the motor 80 which moves the optical head 10 and, based thereon, detect a movement speed of the optical head 10 as a speed of the collecting lens 13. In addition, the lens speed detector 50 may be arranged as a speed sensor to directly detect the movement speed of the optical head 10. In this case, the lens speed detector 50 corresponds to the optical head speed detection unit according to the present invention.

Figure 13:
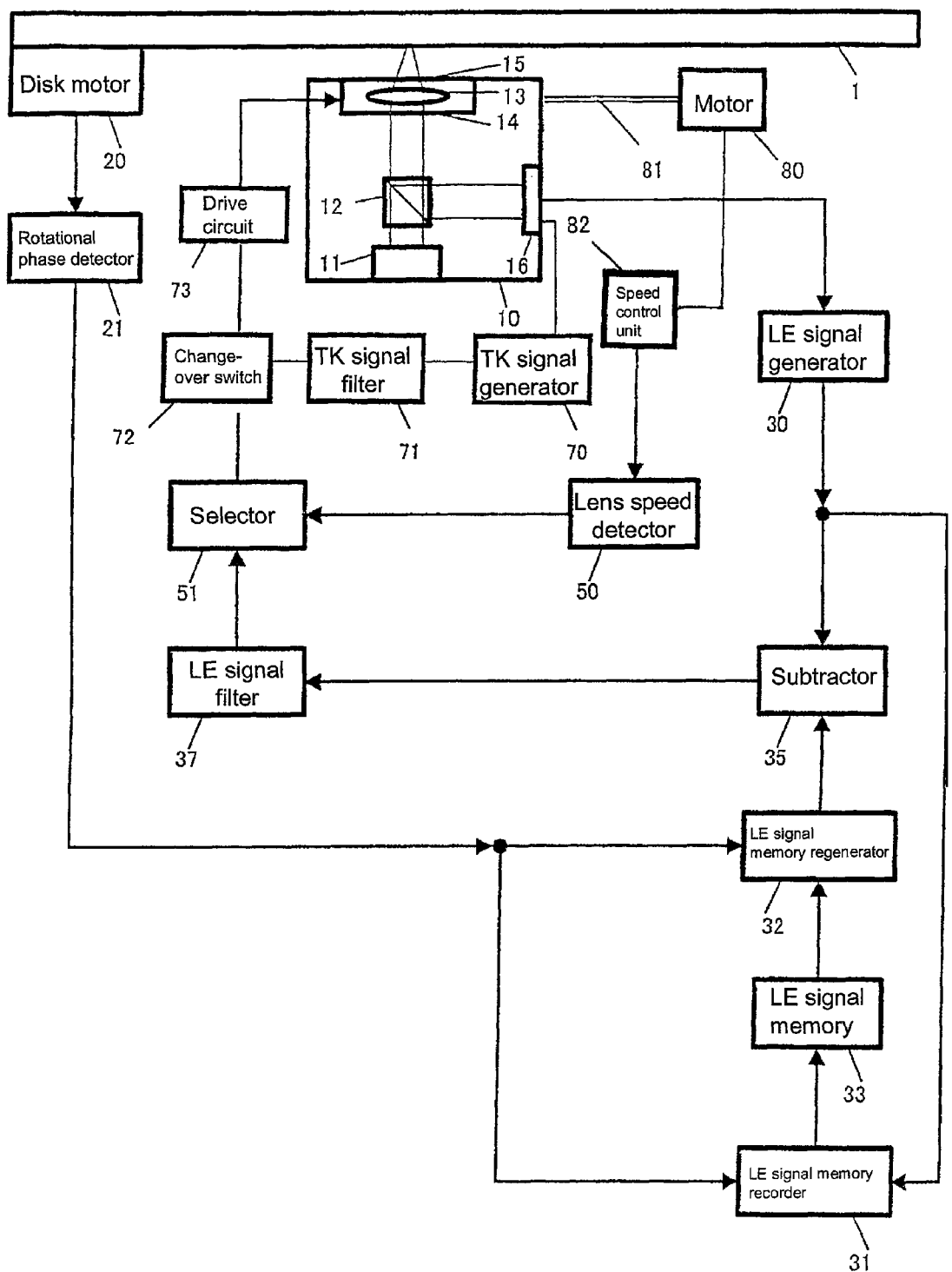
FIG. 13 is a diagram showing a block configuration of another example of an optical disk apparatus according to the third embodiment.

Furthermore, FIG. 13 is a diagram showing yet another configuration example of an optical disk apparatus according to the present third embodiment. With FIG. 13, the lens speed detector 50 is arranged to acquire an optical head movement target profile that is a parameter for determining a movement target speed of the optical head from a speed control unit 82 for driving the motor 80, which moves the optical head 10, at a predetermined speed, and based thereon, detects a movement speed of the optical head 10 as a speed of the collecting lens 13. In this case, the speed control unit 82 corresponds to the optical head movement target retention unit according to the present invention.

In essence, the lens speed detection unit according to the present invention may be arranged to estimate a movement speed in a tracking direction of the collecting lens 13 as a movement of the optical head 10 or to directly measure the movement speed from a movement of the collecting lens 13 itself, and is not limited to a specific configuration thereof.

Additionally, in the above description, while the Tk actuator 15 is arranged to be held at DC level 0 when lens control is not performed, the Tk actuator 15 may be held at an arbitrary voltage value.

In addition, while the above description has been given on an optical disk apparatus, the present invention may also be realized as an integrated circuit in which the respective units of the rotational phase detector 21, the LE signal memory 33 and the LE signal memory recorder 31, the LE signal memory regenerator 32, the subtractor 35, the TKC generator 52 (or the speed control unit 82), the lens speed detector 50 and the selector 51 are integrally formed on the same semiconductor substrate and which is provided with the respective functions thereof.

Fourth Embodiment

Figure 14:
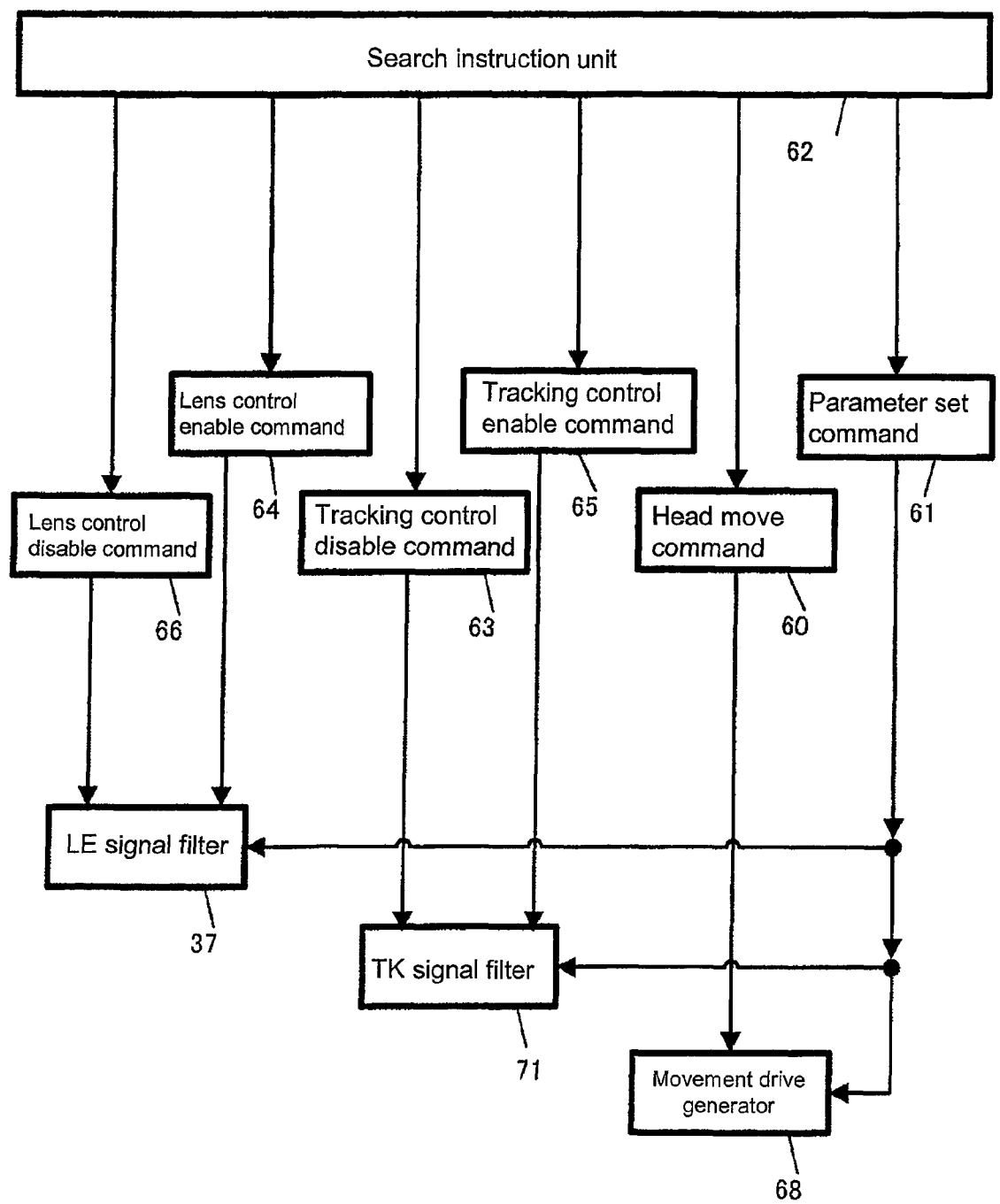
FIG. 14 is a diagram showing a block configuration of a fourth embodiment.

Operations of an optical disk apparatus that is a present fourth embodiment of the present invention will be described with reference to FIG. 14. A block configuration of an optical disk apparatus that is the present fourth embodiment is shown in FIG. 14. It should be noted that components shown in FIG. 14 similar to those shown in FIGS. 16, 1 and 10 representing background art and the present first and third embodiments are assigned like reference numerals, and descriptions on operations similar to these embodiments will be omitted.

In addition, the LE signal filter 37 is an instrument which generates a drive signal which drives the Tk actuator 15 so that the lens position follows the optical head 10 to keep at a predetermined position. A TK signal filter 71 is an instrument which generates a drive signal which drives the Tk actuator 15 so that an optical beam follows a track of the optical disk 1. A movement drive generator 68 is an instrument which generates a drive signal for moving the optical head 10 during a search. A lens control disable command 66 is a command which disables the drive signal from the LE signal filter 37 and causes zero to be generated after the command. A lens control enable command 64 is a command which enables the drive signal from the LE signal filter 37 after the command. A tracking control disable command 63 is a command which disables the drive signal from the TK signal filter 71 and causes zero to be generated after the command. A tracking control enable command 65 is a command which enables the drive signal from the TK signal filter 71 after the command. A head move command 60 is a command which causes the movement drive generator 68 to generate a drive signal for moving the optical head 10 in a radial direction of the optical disk 1 by a specified amount. A parameter set command 61 is a command for setting internal parameters of the LE signal filter 37, the TK signal filter 71 and the movement drive generator 68. A search instruction unit 62 is an instrument which causes a search operation to be executed according to a flowchart shown in FIG. 15.

Incidentally, in the configuration described above, the tracking control disable command 63 and the lens control enable command 64 correspond to a lens control switching command of the invention made by the present inventors to be described later. Hereinafter, in the same manner, the head move command 60 corresponds to the move command. The tracking control enable command 65 and the lens control disable command 66 correspond to the tracking control switching command. The parameter set command 61 corresponds to the parameter set command. The search instruction unit 62 corresponds to the search instruction unit. The tracking control enable command 65 corresponds to the tracking control enable command. The tracking control disable command 63 corresponds to the tracking control disable command. The lens control enable command 64 corresponds to the lens control enable command. The lens control disable command 66 corresponds to the lens control disable command.

Figure 15:
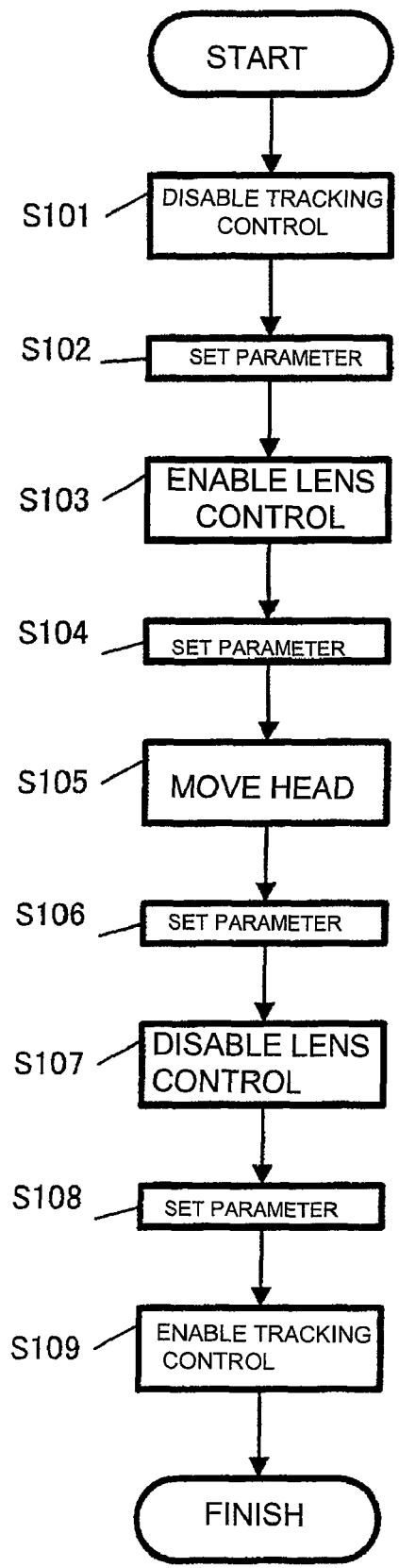
FIG. 15 is a diagram showing an example of a flowchart showing an entire search according to the fourth embodiment.

A step-by-step description of an outline of a search operation by an optical disk apparatus according to the present embodiment configured as described above will now be given with reference to a flowchart example of FIG. 15 showing an entire search.

Step S101: Execute the tracking control disable command 63 specifying that DC drive be retained.

Step S102: Set gain of LE signal filter 37 using parameter set command 61.

Step S103: Execute lens control enable command 64.

Step S104: Set target profile of movement drive generator 68 using parameter set command 61.

Step S105: Execute head move command 60 and move optical head 10 to a predetermined position.

Step S106: Set gain of LE signal filter 37 using parameter set command 61.

Step S107: Execute the lens control disable command 66 specifying that DC drive be retained.

Step S108: Set gain of TK signal filter 71 using parameter set command 61.

Step S109: Execute tracking control enable command 65.

The LE signal filter 37, the TK signal filter 71, the movement drive generator 68, the tracking control enable command 65, the tracking control disable command 63, the lens control enable command 64, the lens control disable command 66, the head move command 60 and the parameter set command 61 are executed by unrewritable software or hardware in a semiconductor for an optical disk apparatus as an integrated circuit according to the present invention. Incidentally, the search instruction unit 62 is configured in a rewritable external CPU.

The search instruction unit 62 which issues instructions for executing commands such as described above separates commands according to each control operation and realizes a search operation by having the external CPU sequentially issue instructions. In addition, parameters such as a gain and the like can be set between the respective commands.

Using the above in operation control of an optical disk apparatus according to the third embodiment, by holding instead of clearing an existing drive DC level when disabling lens control using an LE signal and when disabling tracking control using a TK signal, a transition from tracking control to lens control or, conversely, a transition from lens control to tracking control need not be performed at high speed. Therefore, it is possible to prevent a deterioration of performance such as a disturbance of control which occurs due to an increase in transition speed.

By segmenting at timings which do not require high-speed timings and monofunctionalizing commands in this manner, parameters such as the focus control gain when moving the optical head 10 during a search can be liberally changed from the CPU using a simple configuration without causing performance deterioration.

Incidentally, in the present fourth embodiment, the contents of parameter settings shown in FIG. 14 are merely examples and arbitrary parameters may be set. In addition, the parameters may be used for the optical disk apparatuses according to the first and second embodiments or for controlling a conventional optical disk apparatus.

As an example, the present fourth embodiment may take the form of a search instruction unit of an optical disk apparatus comprising unrewritable software or hardware, the search instruction unit capable of issuing a lens control switching command which, in response to an instruction from an external CPU core, disables control which causes an optical beam to follow a track of an information carrier, and enables control which causes the optical beam to assume a predetermined position with respect to an optical head; a move command which, in response to an instruction from the external CPU core, moves the optical head; a tracking control switching command which, in response to an instruction from the external CPU core, enables control which causes the optical beam to follow a track of an information carrier, and disables control which causes the optical beam to assume a predetermined position with respect to the optical head; and a parameter set command which, in response to an instruction from the external CPU core, is capable of setting a value to an arbitrary RAM, wherein the search instruction unit outputs the lens control switching command, the parameter set command, the move command, the parameter set command and the tracking control switching command in this order.

Incidentally, in the respective embodiments described above, while the respective configurations of the first to fourth embodiments have been arranged to be implemented separately, the respective configurations may be implemented in combination thereof. More specifically, the configuration according to the first and second embodiments which performs processing of the high-frequency component of an LE signal, the configuration according to the third embodiment which controls the execution of lens control based on the movement speed of an optical beam in a tracking direction, and the configuration according to the fourth embodiment in which control of the respective commands is executed by the search instruction unit may be implemented in the same optical disk apparatus.

The program according to the present invention is a program for causing a computer to execute all of or a part of the functions constituting the above-described optical disk apparatus according to the present invention, and may be a program which operates in cooperation with a computer.

In addition, the present invention may be a storage medium storing a program for causing a computer to execute all of or a part of functions of all of or a part of instruments constituting the above-described optical disk apparatus according to the present invention which is computer readable and in which the read program cooperates with the computer to execute the functions.

Incidentally, "a part of instruments" described above according to the present invention may either represent some of the instruments among the plurality of instruments thereof or a part of functions in an instrument.

In addition, a computer-readable storage medium storing the program according to the present invention is also included in the present invention.

Furthermore, in one mode of application of the program according to the present invention, the program may be stored on a computer-readable storage medium and operated in cooperation with the computer.

Moreover, in one mode of application of the program according to the present invention, the program may be transmitted through a transmission medium and read by a computer, and operated in cooperation with the computer.

In addition, storage media include a ROM and the like.

Furthermore, a computer according to the present invention described above is not limited to pure hardware such as a CPU and may be arranged to include firmware, an OS and, furthermore, peripheral devices.

Moreover, as described above, configurations of the present invention may either be realized through software or through hardware.

INDUSTRIAL APPLICABILITY

An optical disk apparatus, a control method of the optical disk apparatus and an integrated circuit according to the present invention achieves an advantage that eccentricity correction operations can be performed stably, and are useful as an optical disk apparatus, a control method of the optical disk, an integrated circuit and the like.

The invention claimed is:

1. An optical disk apparatus comprising:
a rotary drive unit which rotationally drives an information carrier;
a rotational phase detection unit which detects a rotational phase of the information carrier;
an optical head having a collecting unit which collects an optical beam on the information carrier;
a lens position detection unit which detects a position of the collecting unit in the optical head as a position signal;
a lens position storage unit which stores, in synchronization with a rotational phase to be detected by the rotational phase detection unit, the positional signal from the lens position detection unit corresponding to the rotational phase to be detected;
an output unit which outputs as a correction signal, in synchronization with a rotational phase to be detected by the rotational phase detection unit, the positional signal stored by the lens position storage unit and which has already been detected by the lens position detection unit;
a lens position correction unit which corrects the position signal detected by the lens position detection unit using the correction signal;
an eccentricity correction unit which generates a drive signal using a signal from the lens position correction unit and, based thereon, moves the collecting unit in a radial direction of the information carrier; and
a high-frequency component reduction unit which reduces a high-frequency component of any of the correction signal, an output signal of the lens position correction unit and the drive signal.

2. The optical disk apparatus according to claim 1, wherein the high-frequency component reduction unit includes a low pass filter.

3. The optical disk apparatus according to claim 1, wherein the high-frequency component reduction unit differentiates the inputted signal, limits at least one of a maximum value and a minimum value to a predetermined level.

4. The optical disk apparatus according to claim 1, wherein the high-frequency component reduction unit performs linear complementation on the inputted signal.

5. The optical disk apparatus according to claim 1, wherein the output unit outputs the correction signal using a phase difference corresponding to a delay time occurred in the high-frequency component reduction unit.

6. An integrated circuit comprising the respective functions of a rotational phase detection unit which detects a rotational phase of the information carrier; a lens position storage unit which stores, in synchronization with a rotational phase to be detected by the rotational phase detection unit, the positional signal from the lens position detection unit corresponding to the rotational phase to be detected; an output unit which outputs as a correction signal, in synchronization with a rotational phase to be detected by the rotational phase detection unit, the positional signal stored by the lens position storage unit and which has already been detected by the lens position detection unit; a lens position correction unit which corrects the position signal detected by the lens position detection unit using the correction signal; an eccentricity correction unit which generates a drive signal using a signal from the lens position correction unit and, based thereon, moves the collecting unit in a radial direction of the information carrier; and a high-frequency component reduction unit which reduces a high-frequency component of any of the correction signal, an output signal as an inputted signal of the lens position correction unit and the drive signal of the optical disk apparatus according to claim 1.

7. An optical disk apparatus comprising:
a rotary drive unit which rotationally drives an information carrier;
a rotational phase detection unit which detects a rotational phase of the information carrier;
an optical head having a collecting unit which collects an optical beam on the information carrier;
a lens position detection unit which detects a position of the collecting unit in the optical head as a position signal;
a lens position storage unit which stores, in synchronization with a rotational phase to be detected by the rotational phase detection unit, the positional signal from the lens position detection unit corresponding to the rotational phase to be detected;
an output unit which outputs as a correction signal, in synchronization with a rotational phase to be detected by the rotational phase detection unit, the positional signal stored by the lens position storage unit and which has already been detected by the lens position detection unit;
a lens position correction unit which corrects the position signal detected by the lens position detection unit using the correction signal; and
an eccentricity correction unit which generates a drive signal using a signal from the lens position correction unit and, based thereon, moves the collecting unit in a radial direction of the information carrier, wherein
the eccentricity correction unit generates the drive signal without performing a differential operation on a signal outputted from the lens position correction unit.

8. The optical disk apparatus according to claim 7, wherein the eccentricity correction unit includes:
a differential filter which performs a differential operation on the position signal;
an integral proportional filter which performs at least one of a proportional operation and an integral operation on a signal outputted from the lens position correction unit; and
an adder which adds the outputs of the differential filter and the integral proportional filter.

9. An integrated circuit comprising the respective functions of a rotational phase detection unit which detects a rotational phase of the information carrier; a lens position storage unit which stores, in synchronization with a rotational phase to be detected by the rotational phase detection unit, the positional signal from the lens position detection unit corresponding to the rotational phase to be detected; an output unit which outputs as a correction signal, in synchronization with a rotational phase to be detected by the rotational phase detection unit, the positional signal stored by the lens position storage unit and which has already been detected by the lens position detection unit; a lens position correction unit which corrects the position signal detected by the lens position detection unit using the correction signal; and an eccentricity correction unit which generates a drive signal using a signal from the lens position correction unit and, based thereon, moves the collecting unit in a radial direction of the information carrier of the optical disk apparatus according to claim 7.

10. An optical disk apparatus comprising:
- a rotary drive unit which rotationally drives an information carrier;
- a rotational phase detection unit which detects a rotational phase of the information carrier;
- an optical head having a collecting unit which collects an optical beam on the information carrier;
- a lens position detection unit which detects a position of the collecting unit in the optical head as a position signal;
- a lens position storage unit which stores, in synchronization with a rotational phase to be detected by the rotational phase detection unit, the positional signal from the lens position detection unit corresponding to the rotational phase to be detected;
- an output unit which outputs as a correction signal, in synchronization with a rotational phase to be detected by the rotational phase detection unit, the positional signal stored by the lens position storage unit and which has already been detected by the lens position detection unit;
- a lens position correction unit which corrects the position signal detected by the lens position detection unit using the correction signal;
- an eccentricity correction unit which moves the collecting unit in a radial direction of the information carrier based on a signal from the lens position correction unit;
- a lens speed detection unit which detects a speed of the collecting unit; and
- an eccentricity correction operation suspension unit which suspends an operation of the eccentricity correction unit when speed information from the lens speed detection unit is equal to or lower than a predetermined level.

11. The optical disk apparatus according to claim 10, wherein the lens speed detection unit detects a speed of the collecting unit crossing a track of the information carrier.

12. The optical disk apparatus according to claim 11, wherein
- the lens speed detection unit includes a track cross detection which detects an optical beam having crossed the tracks of the information carrier and outputs the result of detection as an edge of a binarization signal, and
- the lens speed detection unit detects a speed of the collecting unit by measuring a cycle of a signal from the track cross detection unit.

13. The optical disk apparatus according to claim 10, wherein
- the lens speed detection unit includes an optical head speed detection unit which detects a movement speed of an optical head including the collecting unit, and
- the lens speed detection unit estimates a speed of the collecting unit based on a signal from the optical head speed detection unit.

14. The optical disk apparatus according to claim 13, wherein the optical head speed detection unit estimates a movement speed of the optical head based on a drive signal for moving the optical head during a search of a track of the information carrier.

15. The optical disk apparatus according to claim 10, wherein
- the lens speed detection unit includes an optical head movement target retention unit which retains an optical head movement target speed profile during a search of a track of the information carrier, and
- the lens speed detection unit estimates a movement speed of the optical head based on a signal from the optical head movement target retention unit.

16. The optical disk apparatus according to claim 10, wherein the lens speed detection unit estimates a speed of the collecting unit using the two values: a speed during a predetermined period upon the start or the finish of a track search operation of the information carrier; and a speed that is greater than the speed during a period other than the predetermined period.

17. The optical disk apparatus according to claim 10, wherein the signal from the lens position detection unit is a top hold push-pull signal.

18. The optical disk apparatus according to claim 10, wherein the eccentricity correction unit holds a DC level of a drive signal for moving the collecting unit upon receiving a suspension control from the eccentricity correction operation suspension unit.

19. The optical disk apparatus according to claim 10 comprising:
- a tracking error signal detection unit which detects a reflected signal from a recording track of the optical disk as a tracking error signal; and
- a tracking control unit which moves the collecting unit in a radial direction of the information carrier based on the tracking error signal, wherein
- the tracking control unit holds a DC level of a drive signal for moving the collecting unit when not performing the operation.

20. An integrated circuit comprising the respective functions of a rotational phase detection unit which detects a rotational phase of the information carrier; a lens position storage unit which stores, in synchronization with a rotational phase to be detected by the rotational phase detection unit, the positional signal from the lens position detection unit corresponding to the rotational phase to be detected; an output unit which outputs as a correction signal, in synchronization with a rotational phase to be detected by the rotational ph ase detection unit, the positional signal stored by the lens position storage unit and which has already been detected by the lens position detection unit; a lens position correction unit which corrects the position signal detected by the lens position detection unit using the correction signal; an eccentricity correction unit which generates a drive signal using a signal from the lens position correction unit and, based thereon, moves the collecting unit in a radial direction of the information carrier; a lens speed detection unit which detects a speed of the collecting unit; and an eccentricity correction operation suspension unit which suspend an operation of the eccentricity correction unit when speed information from the lens speed detection unit is equal to or lower than a predetermined level of the optical disk apparatus according to claim 10.

21. A control method of an optical disk apparatus comprising:
- a step for rotationally driving an information carrier;
- a step for detecting a rotational phase of the information carrier;
- a step for detecting, in an optical head having a collecting unit which collects an optical beam on the information carrier, a position of the collecting unit as a position signal;
- a step for storing, in synchronization with a detected rotational phase, the positional signal from the lens position detection unit corresponding to the rotational phase to be detected;

a step for outputting, in synchronization with a detected rotational phase, the stored and already detected positional signal as a correction signal;

a step for correcting the detected position signal using the correction signal; and a step for generating a drive signal using the corrected position signal and, based thereon, moving the collecting unit in a radial direction of the information carrier, wherein the control method includes:

a step for reducing a high-frequency component of any of the correction signal, an output signal of the lens position correction unit and the drive signal.

22. A control method of an optical disk apparatus comprising:

a step for rotationally driving an information carrier;

a step for detecting a rotational phase of the information carrier;

a step for detecting, in an optical head having a collecting unit which collects an optical beam on the information carrier, a position of the collecting unit as a position signal;

a step for storing, in synchronization with a detected rotational phase, the positional signal from the lens position detection unit corresponding to the rotational phase to be detected;

a step for outputting, in synchronization with a detected rotational phase, the stored and already detected positional signal as a correction signal;

a step for correcting the detected position signal using the correction signal; and a step for generating a drive signal using the corrected position signal and, based thereon, moving the collecting unit in a radial direction of the information carrier, wherein the control method generates the drive signal without performing a differential operation on the corrected position signal.

23. A control method of an optical disk apparatus comprising:

a step for rotationally driving an information carrier;

a step for detecting a rotational phase of the information carrier;

a step for detecting, in an optical head having a collecting unit which collects an optical beam on the information carrier, a position of the collecting unit as a position signal;

a step for storing, in synchronization with a detected rotational phase, the positional signal from the lens position detection unit corresponding to the rotational phase to be detected;

a step for outputting, in synchronization with a detected rotational phase, the stored and already detected positional signal as a correction signal;

a step for correcting the detecting position signal using the correction signal;

a step for generating a drive signal using the corrected position signal and, based thereon, moving the collecting unit in a radial direction of the information carrier;

a step for detecting a speed of the collecting unit; and a step for suspending an operation of the eccentricity correction unit when the detected speed information is equal to or lower than a predetermined level.

24. A computer-readable storage medium with an executable program stored therein, wherein the program instructs at least one microprocessor to perform the following steps:

signaling a rotational phase detection unit to detect a rotational phase of a rotationally driven information carrier;

signaling a lens position detection unit to detect a position of a collecting unit which collects an optical beam from the information carrier;

signaling a lens position storage unit to store, in synchronization with a rotational phase to be detected by the rotational phase detection unit, a positional signal from the lens position detection unit corresponding to the rotational phase to be detected;

signaling an output unit to output as a correction signal, in synchronization with a rotational phase to be detected by the rotational phase detection unit, the positional signal stored by the lens position storage unit and which has already been detected by the lens position detection unit;

signaling a lens position correction unit which corrects the position signal detected by the lens position detection unit using the correction signal;

signaling an eccentricity correction unit which generates a drive signal using a signal from the lens position correction unit and, based thereon, moves the collecting unit in a radial direction of the information carrier; and signaling a high-frequency component reduction unit to reduce a high frequency component of any of the correction signal, an output signal of the lens position correction unit and the drive signal.

25. A computer-readable storage medium with an executable program stored therein, wherein the program instructs at least one microprocessor to perform the steps of:

signaling a rotational phase detection unit to detect a rotational phase of a rotationally driven information carrier;

signaling a lens position storage unit to store, in synchronization with a rotational phase to be detected by the rotational phase detection unit, the positional signal from the lens position detection unit corresponding to the rotational phase to be detected;

signaling an output unit which outputs as a correction signal, in synchronization with a rotational phase to be detected by the rotational phase detection unit, the positional signal stored by the lens position storage unit and which has already been detected by the lens position detection unit;

signaling a lens position correction unit which corrects the position signal detected by the lens position detection unit using the correction signal; and signaling an eccentricity correction unit which generates a drive signal using a signal from the lens position correction unit and, based thereon, moves the collecting unit in a radial direction of the information carrier of the optical disk.

26. A computer-readable storage medium with an executable program stored therein, wherein the program instructs at least one microprocessor to perform the steps of:

signaling a rotational phase detection unit to detect a rotational phase of a rotationally driven information carrier;

signaling a lens position detection unit to detect a position of a collecting unit which collects an optical beam from the information carrier;

signaling a lens position storage unit to store, in synchronization with a rotational phase to be detected by the rotational phase detection unit, the positional signal from the lens position detection unit corresponding to the rotational phase to be detected;

signaling an output unit which outputs as a correction signal, in synchronization with a rotational phase to be detected by the rotational phase detection unit, the positional signal stored by the lens position storage unit and which has already been detected by the lens position detection unit;

signaling a lens position correction unit which corrects the position signal detected by the lens position detection unit using the correction signal;

signaling an eccentricity correction unit which generates a drive signal using a signal from the lens position correction unit and, based thereon, moves the collecting unit in a radial direction of the information carrier;

signaling a lens speed detection unit which detects a speed of the collecting unit; and signaling an eccentricity correction operation suspension unit which suspends an operation of the eccentricity correction unit when speed information from the lens speed detection unit is equal to or lower than a predetermined level.

* * * * *